(12) United States Patent
Kraft

(10) Patent No.: US 11,350,563 B2
(45) Date of Patent: Jun. 7, 2022

(54) AUTONOMOUS GROUNDS MAINTENANCE MACHINES WITH PATH PLANNING FOR TRAP AND OBSTACLE AVOIDANCE

(71) Applicant: THE TORO COMPANY, Bloomington, MN (US)

(72) Inventor: Jason T. Kraft, Stillwater, MN (US)

(73) Assignee: THE TORO COMPANY, Bloomington, MN (US)

( * ) Notice: Subject to any disclaimer, the term of this patent is extended or adjusted under 35 U.S.C. 154(b) by 236 days.

(21) Appl. No.: 16/422,153

(22) Filed: May 24, 2019

(65) Prior Publication Data

US 2019/0357430 A1    Nov. 28, 2019

Related U.S. Application Data

(60) Provisional application No. 62/676,379, filed on May 25, 2018, provisional application No. 62/801,267, filed on Feb. 5, 2019.

(51) Int. Cl.
| | |
|---|---|
| *A01D 34/00* | (2006.01) |
| *A01D 34/64* | (2006.01) |
| *A01D 34/76* | (2006.01) |
| *A01D 34/81* | (2006.01) |
| *G05D 1/00* | (2006.01) |
| *G05D 1/02* | (2020.01) |
| *A01D 101/00* | (2006.01) |

(52) U.S. Cl.
CPC ........... *A01D 34/008* (2013.01); *A01D 34/64* (2013.01); *A01D 34/76* (2013.01); *A01D 34/81* (2013.01); *G05D 1/0055* (2013.01); *G05D 1/0088* (2013.01); *G05D 1/0212* (2013.01); *A01D 2101/00* (2013.01); *G05D 2201/0208* (2013.01)

(58) Field of Classification Search
CPC ...... A01D 34/008; A01D 34/64; A01D 34/76; A01D 34/81; A01D 2101/00; G05D 1/0055; G05D 1/0088; G05D 1/0212; G05D 2201/0208; G05D 1/0214; G05D 1/0274; G05D 2201/0202; G01C 21/04
USPC .......................................................... 701/25
See application file for complete search history.

(56) References Cited

U.S. PATENT DOCUMENTS

| | | | |
|---|---|---|---|
| 9,339,163 B2 * | 5/2016 | Noh | ...................... G05D 1/0231 |
| 9,804,604 B2 | 10/2017 | Mattsson et al. | |

(Continued)

FOREIGN PATENT DOCUMENTS

| | | |
|---|---|---|
| DE | 10 2015 218 225 A1 | 4/2016 |
| EP | 3 225 095 A1 | 10/2017 |

(Continued)

OTHER PUBLICATIONS

U.S. Appl. No. 62/588,680, filed Nov. 20, 2017, Ingvalson et al.

(Continued)

*Primary Examiner* — Muhammad Shafi
(74) *Attorney, Agent, or Firm* — Mueting Raasch Group

(57) ABSTRACT

Operating an autonomous grounds maintenance machine includes determining a travel path for the machine to reach a destination waypoint in a zone of a work region. The travel path is analyzed for problem areas based on a predetermined terrain map. Rotations of the machine may be planned even before the machine begins to travel down the path to proactively prevent the machine from becoming trapped.

23 Claims, 13 Drawing Sheets

(56) References Cited

U.S. PATENT DOCUMENTS

| | | |
|---|---|---|
| 10,031,527 B2 | 7/2018 | Björn |
| 10,037,038 B2 | 7/2018 | Sandin et al. |
| 10,149,430 B2 | 12/2018 | Bergström et al. |
| 10,188,029 B1* | 1/2019 | Brown ................. A01D 34/006 |
| 10,338,602 B2 | 7/2019 | Grufman et al. |
| 2002/0156556 A1 | 10/2002 | Ruffner |
| 2012/0029752 A1 | 2/2012 | Johnson et al. |
| 2012/0265391 A1* | 10/2012 | Letsky ................. G05D 1/0088 |
| | | 701/25 |
| 2013/0041526 A1* | 2/2013 | Ouyang ............... A01D 34/008 |
| | | 701/2 |
| 2013/0238130 A1 | 9/2013 | Dorschel |
| 2014/0121833 A1 | 5/2014 | Lee et al. |
| 2015/0366129 A1* | 12/2015 | Borinato .............. G05D 1/0261 |
| | | 701/25 |
| 2015/0366130 A1 | 12/2015 | Bergstrom et al. |
| 2016/0100522 A1* | 4/2016 | Yamauchi ........... A01D 34/008 |
| | | 701/25 |
| 2016/0113195 A1 | 4/2016 | Das et al. |
| 2016/0165795 A1* | 6/2016 | Balutis ................. G05D 1/0265 |
| | | 701/25 |
| 2016/0326724 A1* | 11/2016 | Hartman .................. B60Q 1/18 |
| 2017/0344012 A1 | 11/2017 | Kamfors et al. |
| 2017/0351260 A1 | 12/2017 | Willgert et al. |
| 2018/0004217 A1* | 1/2018 | Biber ................... G05D 1/0274 |
| 2018/0253098 A1 | 9/2018 | Borinato |

FOREIGN PATENT DOCUMENTS

| | | |
|---|---|---|
| WO | 2014/027945 | 2/2014 |
| WO | 2014/027945 A1 | 2/2014 |
| WO | 2016/097897 | 6/2016 |
| WO | 2016/097897 A1 | 6/2016 |
| WO | 2016/103070 | 6/2016 |
| WO | 2016/103070 A1 | 6/2016 |
| WO | 2018/132048 | 7/2018 |
| WO | 2018/132048 A1 | 7/2018 |
| WO | WO 2019/227001 A1 | 11/2019 |

OTHER PUBLICATIONS

U.S. Appl. No. 62/599,938, filed Dec. 18, 2017, Ingvalson et al.
International Application No. PCT/US2019/033936, filed May 24, 2019; International Search Report and Written Opinion dated Aug. 30, 2019; 14 pages.
European Search Report for EP Appl. No. 19730086.6-1004, dated Nov. 22, 2021, 4 pages.

* cited by examiner

AUTONOMOUS GROUNDS MAINTENANCE MACHINES WITH PATH PLANNING FOR TRAP AND OBSTACLE AVOIDANCE

The present application claims the benefit of U.S. Provisional Application Ser. No. 62/676,379, filed May 25, 2018, and U.S. Provisional Application Ser. No. 62/801,267, filed Feb. 5, 2019, which are incorporated by reference.

Embodiments described herein are directed to autonomous grounds maintenance machines and, in particular, to path planning for autonomous grounds maintenance machines to avoid becoming trapped and to avoid obstacles.

Grounds maintenance machines, such as lawn and garden machines, are known for performing a variety of tasks. For instance, powered lawn mowers are used by both homeowners and professionals alike to maintain grass areas within a property or yard.

Lawn mowers that autonomously perform the grass cutting function are also known. Autonomous lawn mowers are typically battery-powered and are often limited to cutting only a portion of the property before requiring re-charging, which typically requires the mower to return to a charging base station. Further, many autonomous lawn mowers are powered by a differential drive system, meaning that only two wheels are powered at either the front or rear of the mower. This simplifies the power train for operation compared to a four-wheel or all-wheel drive system. Autonomous lawn mowers also generally cut grass in a random travel pattern within a fixed property boundary. The terrain within the fixed property boundary may cause problems for some autonomous lawn mowers, particularly those with differential drive systems. For example, one problem area is a slope with a steep grade sufficient to cause a loss of traction of the differentially driven wheels. In particular, lawn mowers that approach a boundary at a steep grade downhill may become stuck after stopping and attempting to move away from the boundary.

To deal with such problem areas, some autonomous lawn mowers react to variations of the terrain in the fixed property boundary by taking evasive action. For example, evasive maneuvers may be triggered when a level detector senses that the autonomous lawn mower is on a sufficiently steep grade (i.e., too steep for traction). Evasive actions may include reversing course or rotating the lawn mower to exit the problem area.

While sometimes effective, the level detector does not prevent the autonomous mower from becoming stuck in all situations, especially when approaching a boundary. Because the level detector can only sense when the lawn mower has already reached a steep grade, the autonomous mower may have already lost the ability to reverse or turn away from the boundary by the time the steep grade is sensed by the level detector. The loss of traction may impede the ability of the autonomous mower to continue cutting grass throughout an intended work region. The inability to recover traction may diminish the effectiveness of an autonomous mower. In addition, the evasive actions taken when already on the steep grade may work for a period of time but will eventually wear down the surface so subsequent evasive actions in that area may eventually fail and the robot may become stuck. Taking evasive actions on steep grade will also damage the turf, further reducing traction and may require repair in the future.

In addition to potential steep grades, the terrain may include obstacles in the path of the autonomous lawn mower. Such obstacles may impede the ability of the autonomous mower to effectively cover the intended work region. The effectiveness of the autonomous mower may be further reduced when obstacles are present.

SUMMARY

Embodiments of the present disclosure relate to path planning for autonomous grounds maintenance machines to avoid becoming trapped in a problem area by planning rotations of the machine along the travel path based on a predetermined terrain map. Using this proactive technique, the machine may be oriented for maintaining traction when traversing problem areas. The machine may analyze whether a planned travel path will traverse a problem area, such as a steep slope, based on the predetermined terrain map. The machine may decide whether to traverse the problem area in a forward direction (e.g., for a steep uphill slope) or a reverse direction (e.g., for a steep downhill slope). The machine may also avoid obstacles using sensors to detect the obstacle and then deciding whether to change course before or after contacting the obstacle. Problem areas, obstacles, or both may be identified manually by a user or automatically by the machine. Use of these techniques may improve the effectiveness of many autonomous grounds maintenance machines.

In one embodiment, the present disclosure relates to a method of operation for an autonomous grounds maintenance machine. The method includes determining a travel path for the machine to reach a destination waypoint in a work region; analyzing whether the travel path will traverse a problem area based on a predetermined terrain map; determining planned rotations of the machine along the travel path based on the predetermined terrain map; and commanding the machine to propel along the travel path based on the planned rotations.

In another embodiment, the present disclosure relates to an autonomous grounds maintenance machine including a housing defining a front end and a rear end and an implement associated with the housing. The machine includes at least one front wheel supporting the front end of the housing upon a ground surface and two rear wheels supporting the rear end of the housing upon the ground surface. The machine also includes an implement motor supported by the housing and a propulsion system supported by the housing and operably coupled to the rear wheels. The propulsion system is adapted to control speed and rotational direction of the two rear wheels independently, thereby controlling both speed and direction of the housing over the ground surface. The machine further includes a controller operably coupled to the propulsion system. The controller is adapted to generate a plan of travel for the housing. The controller is adapted to autonomously: determine a travel path for the housing to reach a destination waypoint in a work region; analyze whether the travel path traverses a problem area based on a predetermined terrain map; plan rotations of the housing based on the predetermined terrain map; and command the propulsion system to propel the housing along the travel path based on the planned rotations.

In yet another embodiment, the present disclosure relates to an autonomous grounds maintenance machine including a housing defining a front end and a rear end and an implement associated with the housing. The machine includes at least one front wheel supporting the front end of the housing upon a ground surface and two rear wheels supporting the rear end of the housing upon the ground surface. The machine also includes an implement motor supported by the housing and a propulsion system supported by the housing and operably coupled to the rear wheels. The propulsion system is adapted to control speed and rotational direction of the two rear wheels independently, thereby controlling both speed and direction of the housing over the ground surface. The machine further includes an obstacle sensing circuit positioned to detect an obstacle in the direction of the front or rear end of the housing and a controller operably coupled to the propulsion system and the obstacle sensing circuit. The controller is adapted to autonomously: determine planned rotations of the housing based on a predetermined terrain map and a current travel path; detect an obstacle along the current travel path to a destination waypoint in a work region using the obstacle sensing circuit; determine whether the destination waypoint is a next coordinate within a current zone or a starting coordinate within a new zone of the work region; in response to the destination waypoint being a next coordinate within the current zone, avoid the obstacle using a command to the propulsion system to propel the housing along the current travel path until contact with the obstacle is made; and command the propulsion system to propel the housing toward the destination waypoint after avoiding the obstacle.

The summary is not intended to describe each embodiment or every implementation of the present disclosure. A more complete understanding will become apparent and appreciated by reference to the following detailed description and claims taken in view of the accompanying figures of the drawing.

BRIEF DESCRIPTION OF THE DRAWINGS

Illustrative embodiments will be further described with reference to the figures of the drawing, wherein.

Figure 1:
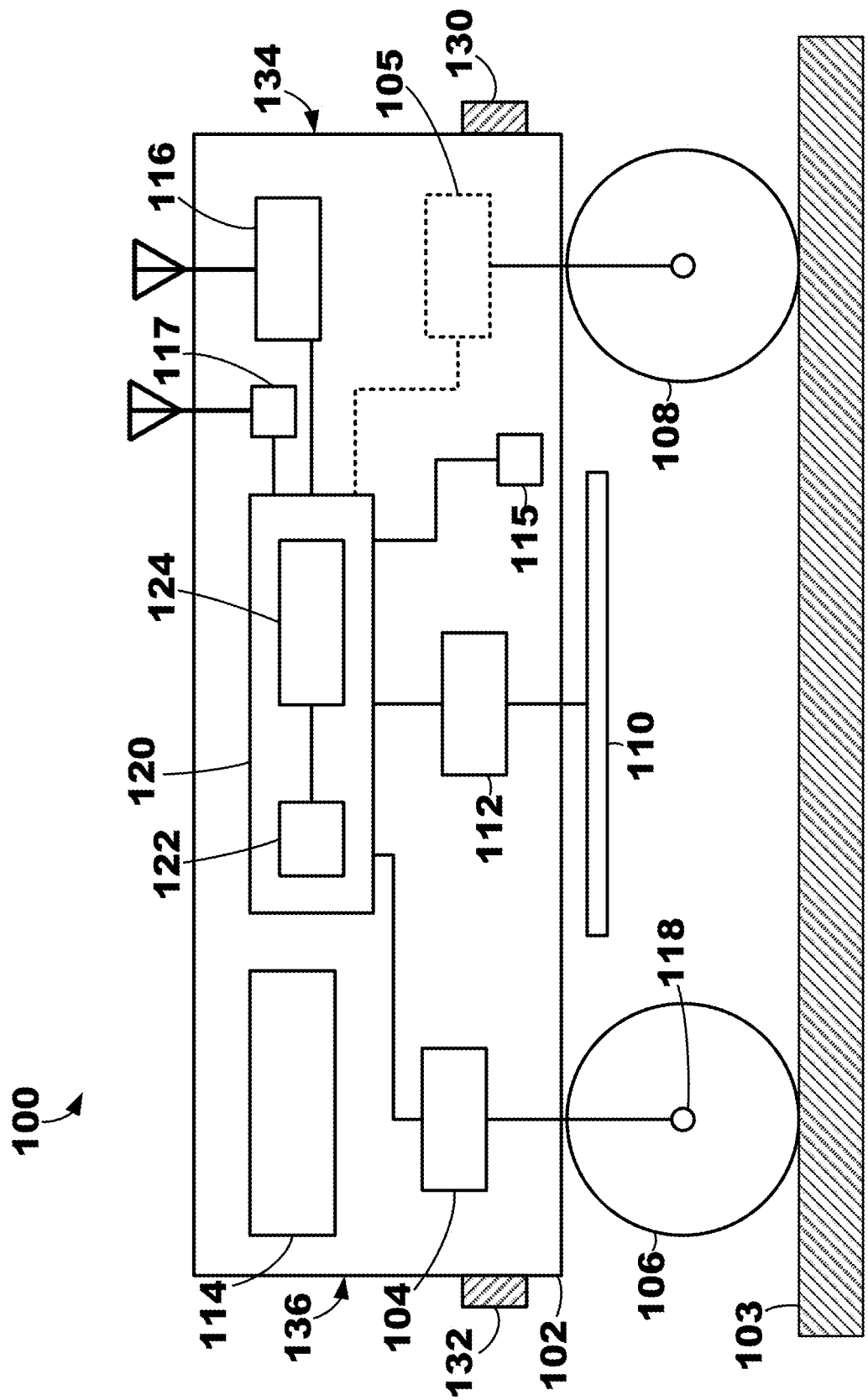
FIG. 1 is a diagrammatic elevation view of an autonomous grounds maintenance machine incorporating path planning in accordance with one embodiment of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various illustrative embodiments described herein. The lack of illustration/description of such structure/components in a particular figure is, however, not to be interpreted as limiting the scope of the various embodiments in any way. Still further, the terms "Figure" and "FIG." may be used interchangeably herein.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g.," is used as an abbreviation for the Latin phrase exempli gratia and means "for example."

The term "or" is generally employed in its inclusive sense, for example, to mean "and/or" unless the context clearly dictates otherwise. The term "and/or" means one or all of the listed elements or a combination of at least two of the listed elements.

Embodiments of the present disclosure provide autonomous grounds maintenance machines and methods of operating the same with path planning in a work region to achieve improved coverage of the work region during operation. For example, the machine may be an autonomous mower adapted to cut grass within a work region (e.g., a turf surface of a residential or commercial property) as the mower travels across the work region. By implementing techniques like those described and illustrated herein, such a mower may be able to achieve more efficient cutting coverage than may otherwise be provided with known random-travel coverage methods.

Techniques of the present disclosure relating to path planning for autonomous grounds maintenance machines may facilitate avoiding becoming trapped in a problem area by planning rotations of the machine along the travel path based on a predetermined terrain map. Using this proactive technique, the machine may be oriented for maintaining traction when traversing problem areas. The machine may analyze whether a planned travel path will traverse a problem area, such as a steep slope, based on the predetermined terrain map. The machine may decide whether to traverse the problem area in a forward direction (e.g., for a steep uphill slope) or a reverse direction (e.g., for a steep downhill slope). The machine may also avoid obstacles using sensors to detect the obstacle and then deciding whether to change course before or after contacting the obstacle. Problem areas, obstacles, or both may be identified manually by a user or automatically by the machine. Use of these techniques may improve the effectiveness of many autonomous grounds maintenance machines.

While described herein as an autonomous mower, such a configuration is illustrative only as systems and methods described herein also have application to other autonomous ground maintenance machines including, for example, commercial mowing products, other ground working machines or vehicles (e.g., debris blowers/vacuums, aerators, dethatchers, material spreaders, snow throwers), as well as indoor working vehicles such as vacuums and floor scrubbers/cleaners (e.g., that may encounter obstacles).

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine 100 is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described.

While the construction of the actual grounds maintenance machine is not necessarily central to an understanding of this disclosure, FIG. 1 illustrates one example of an autonomous grounds maintenance machine (e.g., an autonomously operating vehicle, such as an autonomous lawn mower 100) of a lawn mowing system (for simplicity of description, the mower 100 is illustrated schematically). As shown in this view, the mower 100 may include a housing 102 (e.g., frame or chassis with a shroud) that carries and/or encloses various components of the mower as described below. The mower 100 may further include ground support members, e.g., one or more rear wheels 106 and one or more front wheels 108, that support the housing 102 upon a ground (e.g., grass) surface 103. As illustrated, the front wheels 108 are used to support a front end 134 of the mower housing 102 and the rear wheels 106 are used to support the rear end 136 of the mower housing.

One or both of the rear wheels 108 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. That is to say, the propulsion system may include a separate wheel motor 104 for each of a left and right rear wheel 106 so that speed and direction of each rear wheel may be independently controlled. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the blade 110. While illustrated herein using only a single blade 110 and/or motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single implement motor are also contemplated.

The mower 100 may further include one or more sensors to provide location data. For instance, some embodiments may include a global positioning system (GPS) receiver 116 (or other position sensor that may provide similar data) that is adapted to estimate a position of the mower 100 within a work region and provide such information to a controller 120, which is described in more detail below. In other embodiments, one or more of the wheels 106, 108 may include encoders 118 that provide wheel rotation/speed information that may be used to estimate mower position (e.g., based upon an initial start position) within a given work region. The mower 100 may further include a sensor 115 adapted to detect a boundary wire when the latter is used to define a boundary of the work region.

The mower 100 may incorporate one or more front obstacle detection sensors 130 and one or more rear obstacle detection sensors 132. The obstacle detection sensors 130, 132 may be used to detect an obstacle in the path of the mower 100 when travelling in a forward or reverse direction, respectively. The mower 100 is capable of mowing while moving in either direction. As illustrated, the sensors 130, 132 may be located at the front end 134 or rear end 136 of the mower 100, respectively. The sensors 130, 132 may use contact sensing, non-contact sensing, or both types of sensing. For example, both contact and non-contact sensing may be enabled concurrently or only one type of sensing may be used depending on the status of the mower 100 (e.g., within a zone or travelling between zones). One example of contact sensing includes using a contact bumper protruding from the housing 102 that can detect when the mower 100 has contacted the obstacle. Non-contact sensors may use acoustic or light waves to detect the obstacle, preferably at a distance from the mower 100 before contact with the obstacle (e.g., using infrared, radio detection and ranging (radar), light detection and ranging (lidar), etc.).

In addition to the sensors described above, other sensors now known or later developed may also be incorporated into the mower 100.

The mower 100 may also include a controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GPS receiver 116 and/or encoders 118 and generate speed and steering angle commands to the drive wheel motor(s) 104 to cause the drive wheels 106 to rotate (at the same or different speeds and in the same or different directions). In other words, the controller 120 may control the steering angle and speed of the mower 100, as well as the speed and operation of the cutting blade.

In addition, the mower 100 may be in operative communication with a separate device, such as a smartphone or remote computer. A problem area or obstacle may be identified, or defined, using an application on the smartphone or remote computer, or the like. For example, a user may identify a problem area or obstacle on a map of a mowing area. One example of an obstacle is a permanent obstacle, such as a boulder. The mower 100 may receive the identified problem area or obstacle from the separate device. In such cases, the mower 100 may be configured to mow only in a certain direction through the problem area in response to receiving the identified problem area, or the mower may be configured to take proactive evasive maneuvers to avoid running into the obstacle while traversing a slope and may create an exclusion zone around a permanent obstacle in response to receiving the identified obstacle.

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination thereof.

In FIG. 1, schematic connections are generally shown between the controller 120 and the battery 114, wheel motor(s) 104, blade motor 112, optional boundary wire sensor 115, wireless radio 117, and GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with the sensors 130, 132 are not shown, these sensors and other components of the mower 100 may be connected in a similar manner.

Figure 2:
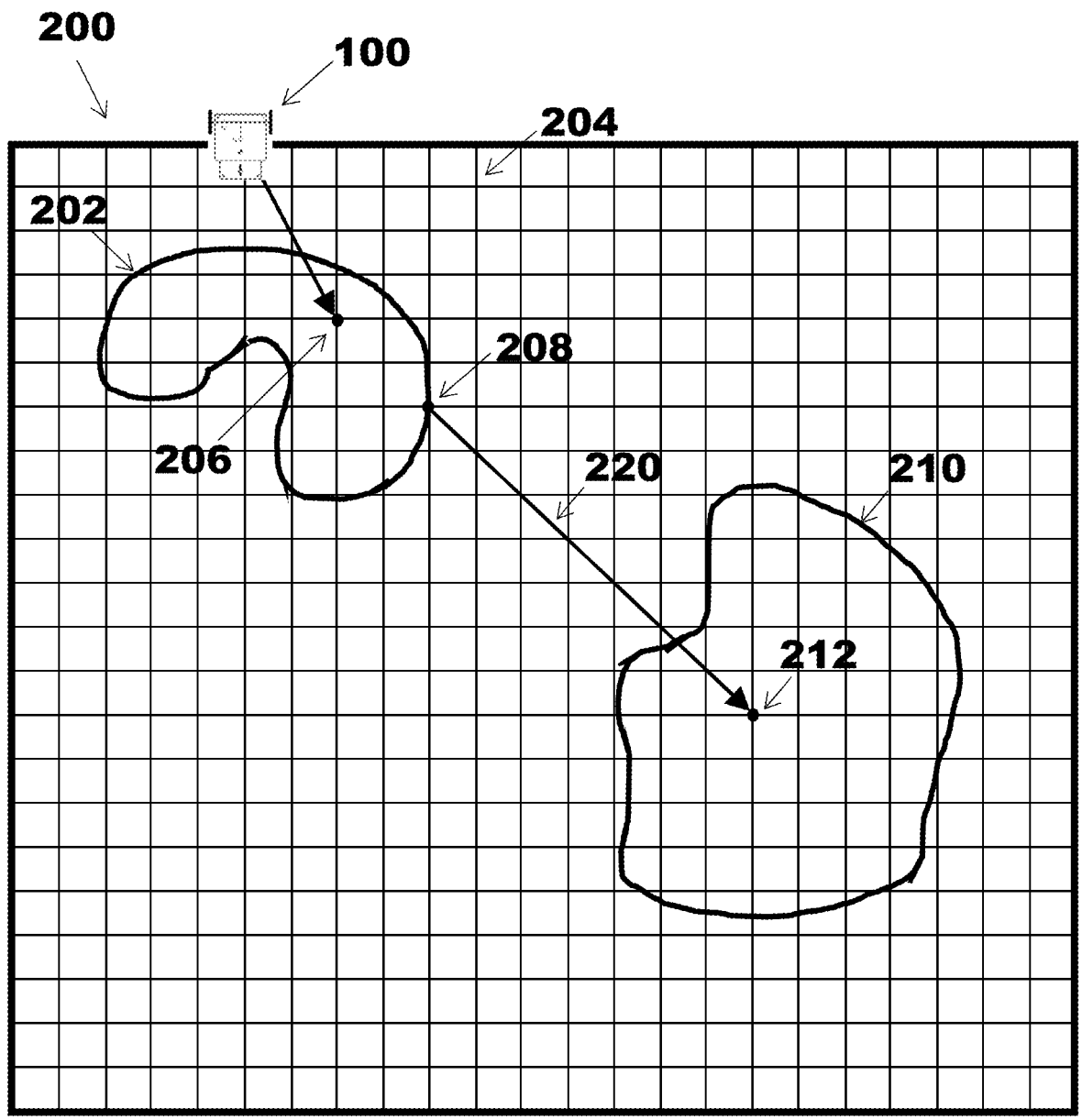
FIG. 2 is an overhead view of a work region for the machine of FIG. 1 to cover in accordance with one embodiment of the present disclosure.

Although the mower 100 may cover an area using various methods, FIG. 2 shows one example of a work region 200 to cover with the mower 100 using a plurality of zones 202, 210. A fixed property boundary or other type of boundary may be used to define the work region 200. The mower 100 may be operated to travel through the work region 200 along a number of paths to sufficiently cut all the grass in the work region 200. The mower 100 may recharge as needed, for example, when transitioning between zones 202, 210. A recharging base (not shown) may be located within the work region 200.

The work region 200 may be mapped with a terrain map. For example, the terrain map may be developed during a teaching mode of the mower, or during successive initial mowing operations. Regardless, the terrain map may contain information about the terrain of the work region 200, for example, elevation, grade, identified obstacles (e.g., permanent obstacles), identified stuck areas (e.g., areas the mower has gotten stuck whether due to grade or other traction conditions), or other information that may facilitate the ability of the mower 100 to traverse the work region. For example, the terrain map may store elevation data or grade data for a plurality of coordinates in a coordinate system 204 (e.g., Cartesian grid) covering the work region 200. In some cases, identified stuck areas may not be associated with a steep grade, but these areas may be treated like a steep grade if the mower 100 begins to, or continues to, have problems in that stuck area.

The coordinate system 204 is shown for illustrative purposes only. The resolution of points stored in the terrain map may be sufficient to provide useful elevation and/or grade information about the terrain in the work region 200 (e.g., on the order of feet or decimeters). For example, the resolution of points may correspond to spacing between points being less than or equal the width of the mower 100. In some cases, different functions of path planning may use different levels of resolution. For example, path planning that maps containment or exclusion zones may have the highest resolution (e.g., on the order of centimeters). In other words, the resolution of points proximate to, adjacent to, or near irregular boundaries or obstacles may have a finer granularity.

The mower 100 may start coverage of the work region 200 starting at a boundary of the work region. The mower 100 may determine a first zone 202. The zone 202 may be located adjacent to a boundary of the work region 200 or, as illustrated, may be located further within the work region. In one embodiment, the zone 202 is a dynamic zone, such as a travelling containment zone (e.g., smart zone), for which the zone expands as operation progresses. In some cases, the dynamic zone 202 may expand to cover the entire work region 200. In other cases, the dynamic zone 202 may expand to a point and, when the mower 100 is finished mowing the dynamic zone, the mower 100 may start another zone (e.g., zone 210, which may be dynamic or fixed) to continue mowing.

In another embodiment, the zone 202 is a static zone with a fixed boundary within the work region 200. Typically, the static zone 202 does not cover the entire work region 200. When the mower 100 is finished with mowing the static zone 202, the mower may start another zone (e.g., zone 210, which may be dynamic or fixed) to continue mowing.

The mower 100 may determine a starting coordinate or point 206 within the first zone 202. In some embodiments, the starting coordinate 206 may be selected from the highest point within the zone 202. The mower 100 may rotate, if needed, to orient itself toward the starting coordinate 206 from its current position at the boundary of the work region 200. The mower 100 may propel itself toward the starting coordinate 206.

After arriving at the starting coordinate 206, the mower 100 may begin travelling through the zone 202 to cut grass within the zone. As described below, the mower 100 may use randomly-generated destination waypoints within the zone. In addition, or in the alternative, the mower 100 may use a planned pattern with planned waypoints within the zone. Such pattern mowing may use planned waypoint creation to cover the zone.

When the mower 100 arrives at a final destination waypoint 208, the mower is finished cutting grass within the current zone 202. The mower 100 may determine a next zone 210 and a next starting point 212 within the next zone. The mower 100 may orient itself and begin travelling to the next starting point 212. The path 220 from a final destination waypoint 208 in a zone 202 or toward a next starting point 212 in a next zone 210 may be described as a "go to goal" path.

Once the mower 100 arrives at the next starting point 212, the mower 100 may begin travelling through the next zone 210. The process of generating and working travelling containment zones may be repeated a number of times to provide sufficient coverage of the work region 200.

In general, the mower 100 is configured to approach a slope with a steep grade in an optimal way to prevent getting stuck upon encountering an obstacle on that slope. For instance, without the techniques of the present application, a mower using rear wheel drive may travel forward down a hill and bump into a tree, the mower may not be able to back away from the tree and may get stuck. In contrast, the mower 100 of the present application using real wheel drive may be configured to travel down the same hill in reverse. For example, when the mower 100 bumps into a tree, the mower may have more traction than the mower going forward and may be more capable of travelling away from the tree without getting stuck.

Figure 3:
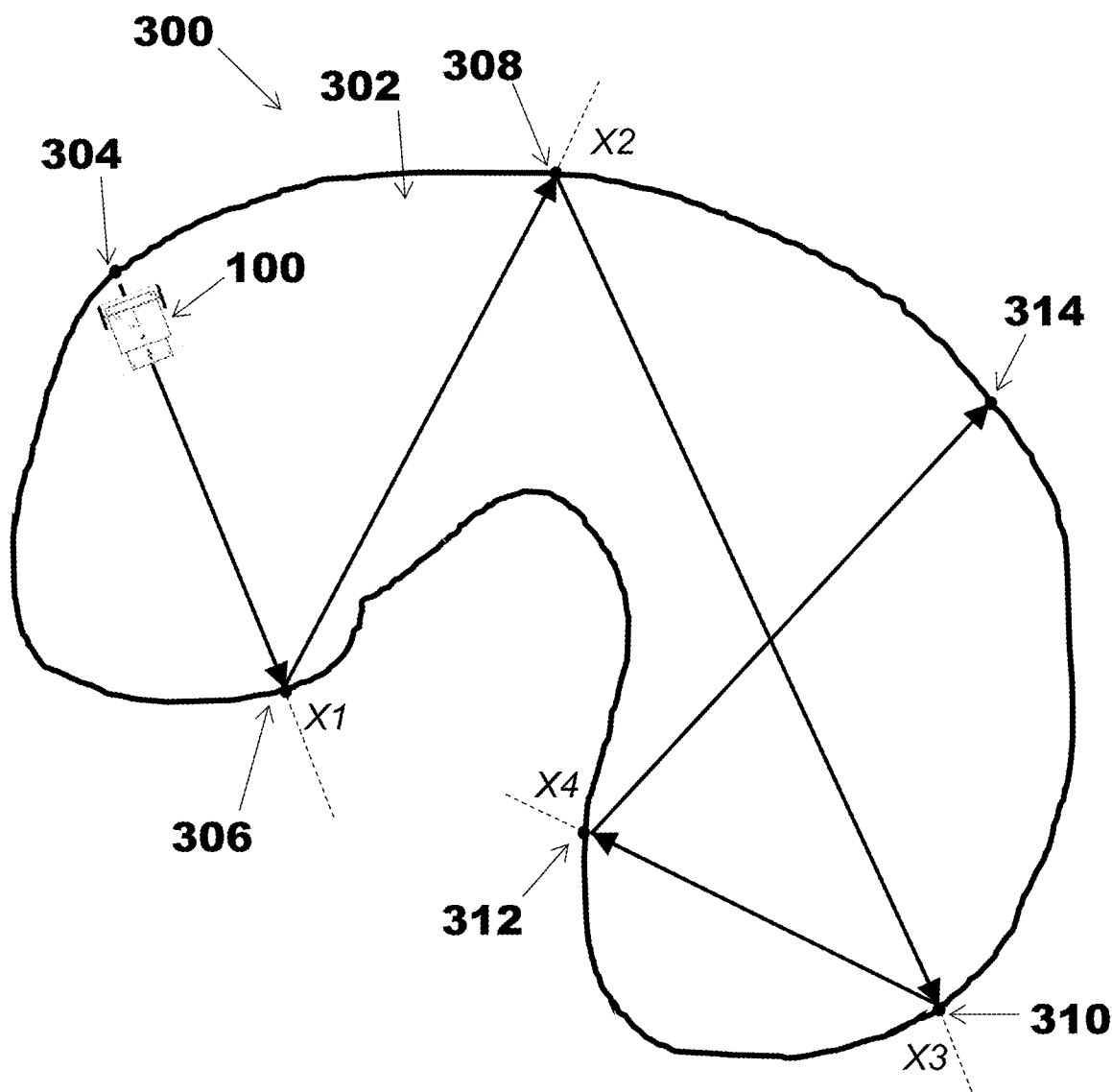
FIG. 3 is an overhead view of a zone within the work region of FIG. 2 and pathing of the machine of FIG. 1 within the zone in accordance with one embodiment of the present disclosure.

In FIG. 3, one method 300 of covering a zone 302 is shown as an overhead view illustrating a sequence of paths for taking the mower 100 through at least part of the zone. In the illustrated embodiment, the mower 100 travels from starting point 304 to destination waypoint 306. After reaching destination waypoint 306, the mower 100 may determine a second destination waypoint 308, rotate X1 degrees, and travel toward the second destination waypoint. This sequence of rotating and travelling may continue to reach third destination waypoint 310, fourth destination waypoint 312, and final destination waypoint 314 (e.g., using rotations X2, X3, and X4, respectively). The mower 100 may rotate in the opposite directions and arrive at the same orientation (e.g., 360 degrees minus X1 degrees in the opposite direction is the same orientation as rotating X1 degrees). Although only a few destination waypoints 306, 308, 310, 312, 314 are shown in this illustration, the mower 100 may travel to several more waypoints in order to sufficiently cover the zone 302. In some embodiments, the mower 100 may select the smallest angle available to rotate and orient itself toward the next destination waypoint (e.g., 90 degrees counter-clockwise instead of 270 degrees clockwise). In other embodiments, the mower 100 may rotate using the larger, or largest, angle.

While described herein in the context of independent, static zones, such a configuration is not limiting as embodiments of the present disclosure may be used to cover a work region using a travelling containment zone as described in U.S. Provisional Application No. 62/588,680 (Ingvalson et al.), filed Nov. 20, 2017, entitled "System and method for operating an autonomous robotic working machine within a travelling containment zone," and U.S. Provisional Application No. 62/599,938 (Ingvalson et al.), filed Dec. 18, 2017, entitled "System and method for operating an autonomous robotic working machine within a travelling containment zone," which are incorporated herein by reference.

When the mower 100 selects a next destination waypoint, the mower may use a predetermined terrain map to determine an orientation or direction for the mower. In particular, the terrain map may be used to determine an orientation or direction for the path to the next destination waypoint.

Figure 4:
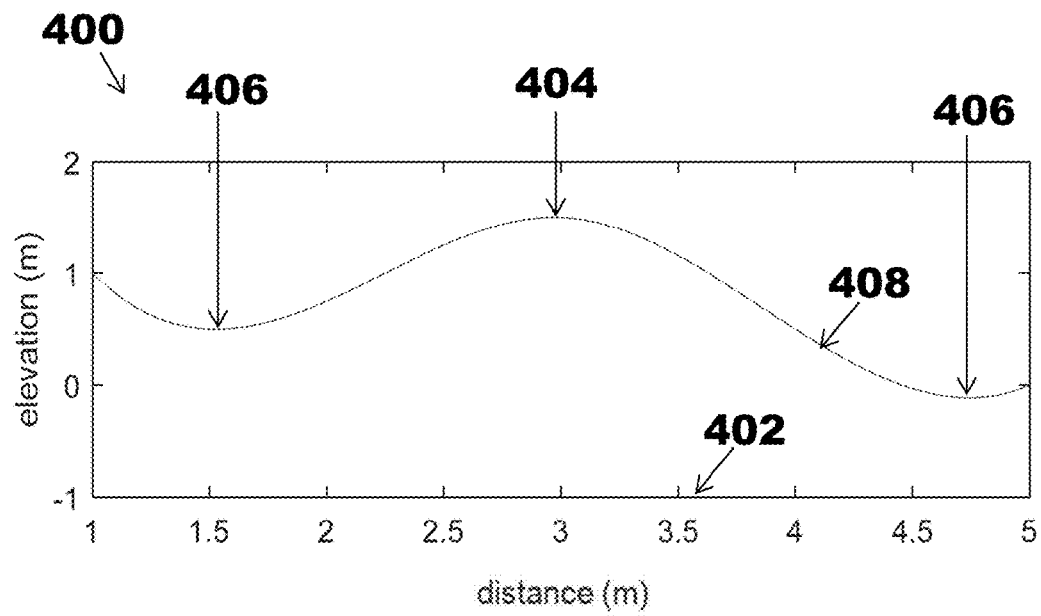
FIG. 4 is a plot of elevation versus distance along a travel path in accordance with one embodiment of the present disclosure.

In FIG. 4, one illustration of data that may be contained in a terrain map is shown as elevation plot 400 that maps elevation to distance along one illustrative path 402 with an elevation curve 408. The elevation data for a work region may be determined in various ways. In one example, the first time the mower 100 traverses a work region, the mower 100 may collect elevation data. As illustrated, elevation plot 400 corresponds to a cross-section of a terrain map. Populating the entire terrain map based on a plurality of cross-sections may take time (e.g., more than one pass through the map). The mower 100 may fill in parts of the terrain map not yet measured using two-dimensional interpolations of elevation data that has already been measured. Also, although the mower 100 may collect elevation data in discrete samples, the plot 400 may be generated using a smoothing function, such as a line fitting algorithm, to extrapolate a smooth curve for the elevation curve 408 as illustrated.

The mower 100 may analyze the elevation curve 408 along the path 402 for various information. In some embodiments, the mower 100 may select a highest elevation within a zone as a starting coordinate, or waypoint in a new travelling containment zone.

Figure 5:
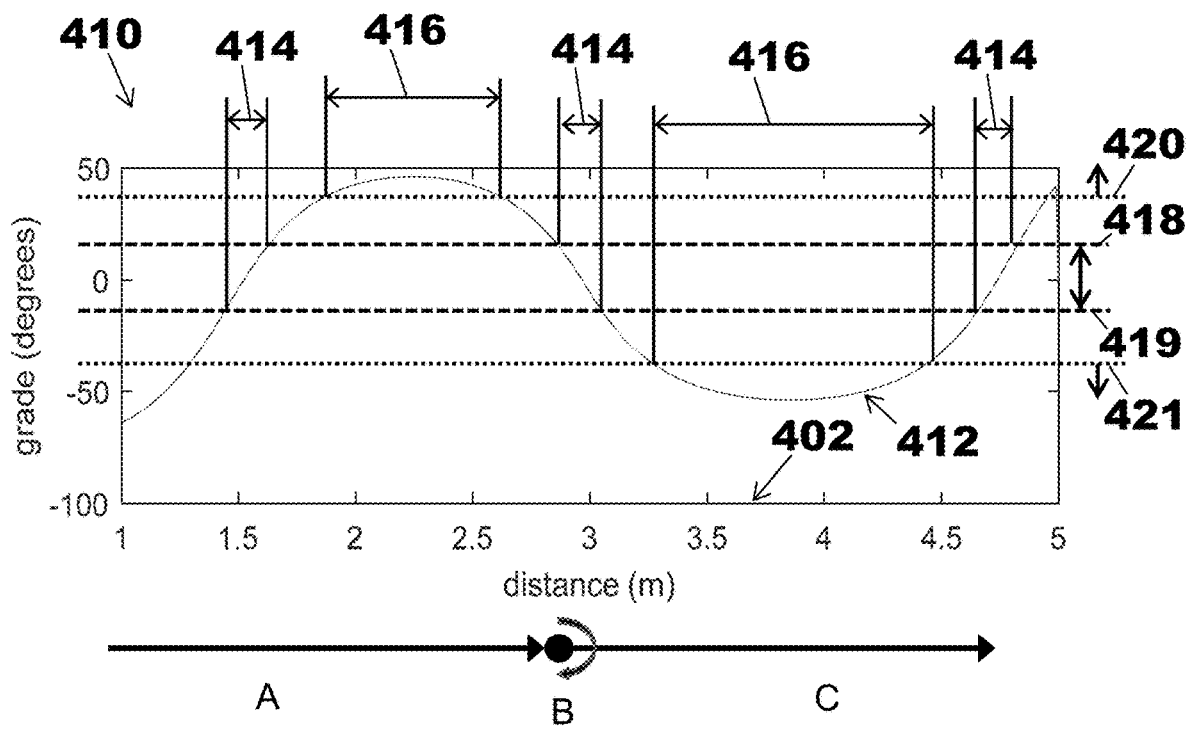
FIG. 5 is a plot of grade versus distance along the travel path of FIG. 4.

The mower 100 may use the elevation data along path 402 to determine a grade curve 412 that corresponds to the path 402 of elevation plot 400 shown as plot 410 in FIG. 5, which is another illustration of data that may be contained in the terrain map such as, for example, elevation data of a cross-section of the terrain map. As illustrated, the plot 410 maps grade (in degrees) to distance along the path 402. The grade curve 412 may be calculated based on the discrete elevation data or on the smooth elevation curve 408. The plot 410 may be generated using a smoothing function, such as a line fitting algorithm, to extrapolate a smooth curve for the grade curve 412. The grade curve 412 may be calculated as a plurality of slopes or using a differential function of the elevation curve 408.

Additionally, or alternatively, the mower 100 may determine and store gradient directly, for example, based on measuring pitch and roll data. The grade curve 412 may be computed, for example, using a combination of elevation data and gradient stored by the mower 100.

In general, the rear wheels 106 (FIG. 1) of the mower 100 will have more traction when travelling uphill in a forward direction compared to travelling downhill going forward. Likewise, the mower 100 generally has more traction when travelling downhill in a reverse direction compared to travelling uphill in reverse. The opposite may be true for a front-wheel drive mower. The techniques described herein orient the rear-wheel drive mower 100 in a forward direction to provide traction to the rear wheels 106 when going uphill and orient the mower in a reverse direction when going downhill. As described herein, the mower 100 may only rotate when the uphill or downhill grade is steep enough to cause a problem for the mower (e.g., problem areas). That is, some uphill or downhill slopes with shallow grades may not require the mower 100 to be oriented in the forward or reverse direction, respectively, so the mower may traverse some shallow uphill grades in the reverse direction or some shallow downhill grades in a forward direction.

In some embodiments, the mower 100 may be configured to determine or store mass property data (e.g., mass distribution data) and pitch and/or roll data. For example, pitch and/or roll may be measured to generate the data. Any suitable technique may be used to determine mass property data and pitch and/or roll data, such as those known to a person of ordinary skill in the art having the benefit of this disclosure. Non-limiting examples of techniques for determining mass property data include using 3D computer-assisted design/drafting (CAD) tools or using weigh scales. Pitch and/or roll data may be determined by a navigation system of the mower 100. The navigation system may be configured to fuse sensor data from one or more sensors to provide pitch and/or roll data. Non-limiting examples of on-board sensors include: inertial measurement units (IMUs), wheel sensors, global positioning systems (GPS), or any other devices suitable for determining position and/or orientation of the mower 100. The orientation of the mower 100 may include, for example, pitch, roll, and yaw/heading.

Using the mass property data and the pitch and/or roll data, the mower 100 may be configured to determine how weight is distributed to each of its wheels and determine a maximum traction force available at each wheel to execute a maneuver. The mower 100 may apply limited wheel torque to one or more wheels so that the maximum traction forces are not exceeded during the maneuver. For example, if the mower 100 is on a slope, the mower may determine which drive wheel 106 has less traction and limit the acceleration of this drive wheel accordingly. In another example, when the mower 100 is accelerating on up or down a hill, torque may be limited to both wheels.

In one or more embodiments, the mower 100 may determine that certain maneuvers (e.g., traversing forward or in reverse or pivot turning) should not be executed based on a particular pitch and/or roll in the pitch and/or roll data. In one example, the mower 100 may have a high roll angle due to the presence of a hill and may determine that a maneuver to pivot turning to face uphill at this high roll angle should not be executed. In general, the mower 100 may be configured to avoid slip proactively, rather than only reacting to a slip event, which may facilitate avoiding situations where the mower cannot recover (e.g., becomes stuck).

The grade curve 412 may be used to identify various points or areas of the terrain along the path 402. For example, one or more local maxima 404 (FIG. 4) and one or more local minima 406 (FIG. 4) may be determined (e.g., where the grade curve equals zero). The mower 100 may select one of the local maxima 404 or minima 406 along the path 402, or within the entire zone, as a starting coordinate. In particular, the mower 100 may select a local maximum 404 or minimum 406 having the smallest local grade (e.g., flattest area).

The local grade may be determined by comparing a plurality of grades stored in a terrain map and identifying the grade having the smallest absolute magnitude. The local grade may be calculated as a vector based on stored elevation data. To find the smallest local grade, the terrain map may be searched for cells in the zone. Then, those cells in the zone may be compared to identify the smallest stored or calculated gradient.

The local maxima 404 and minima 406 may be associated with rotatable areas 414. In general, rotatable areas 414 are associated with a range of grades along the path 402 that encompass flat areas and small slopes. Rotatable areas 414 may include local maxima 404 and minima 406 as shown by comparison of FIGS. 4 and 5. An ideal rotatable area 414 may include a zero-grade point (e.g., a maxima or minima of elevation).

Problem areas 416 may be associated with a range of high magnitude grades (including highly positive and highly negative grades) along the path 402 that encompass the steepest slopes as can be seen by comparison of FIGS. 4 and 5. The problem areas 416 are associated with grades that the mower 100 should not traverse without considering the orientation of the mower.

In some cases, the problem areas may include impassable areas. Impassable areas may be defined by grades that the mower cannot traverse without excessive difficulty. The mower may avoid, or skip over, the current path 402 if an impassable area (e.g., too steep a grade) is determined to lie along the path. For example, the mower may detect a grade that exceeds a threshold in its path and stop before reaching the grade or soon after reaching the grade. The threshold may be determined based on, for example, a jurisdictional or industrially-accepted standard. The mower may attempt to move to an area with a lower grade within a time window. When the time window expires, the user may manually provide instructions, commands, or guidance to move the mower.

The mower 100 may determine one or more rotatable areas 414 based on the grade curve 412. The rotatable areas 414 may be determined using one or more grade thresholds, which may include an upper grade threshold 418 (e.g., positive grade) and a lower grade threshold 419 (e.g., negative grade) for rotatable areas. Where the magnitude of the grade curve 412 does not exceed either of the grade thresholds 418, 419, the mower 100 may designate that portion of the path 402 as a rotatable area 414. For the illustrated grade curve 412, three rotatable areas 414 are shown along the path 402 associated with portions of the grade curve 412 that are not higher than the upper grade threshold 418 for rotatable areas and are not lower than the lower grade threshold 419 for rotatable areas.

The mower 100 may determine one or more problem areas 416 based on the grade curve 412. The problem areas 416 may be determined using one or more grade thresholds, which may include an upper grade threshold 420 (e.g., positive grade) and a lower grade threshold 421 (e.g., negative grade). In general, the thresholds 418, 419 for rotatable areas and the thresholds 420, 421 for problem areas are different but, in some embodiments, may be close in value or even the same. Where the magnitude of the grade curve 412 exceeds one of the grade thresholds 420, 421, the mower 100 may designate that portion of the path 402 as a problem area 416. For the illustrated grade curve 412, two problem areas 416 are shown along the path 402 associated with portions of the grade curve 412 that are higher than the upper grade threshold 420 for problem areas or are lower than the lower grade threshold 421 for problem areas.

In some embodiments, the absolute values of the grade curve 412 may be used and compared with a grade threshold. Where the absolute value of the grade curve 412 does not exceed the one grade threshold (e.g., grade threshold 418) for rotatable areas, that portion of the path 402 may be designated as a rotatable area 414. Where the absolute value of the grade curve 412 does exceed the one grade threshold (e.g., grade threshold 420) for problem areas, that portion of the path 402 may be designated as a problem area 416.

The mower 100 may use the identified rotatable areas 414 and problem areas 416 along the path 402 to determine planned rotations of the mower along the travel path 402. In particular, when the mower 100 identifies problem areas 416 along the travel path 402, the mower may analyze whether the travel path includes prior rotatable areas 414 that the mower will traverse before reaching the problem area. The prior rotatable areas 414 may be used to orient the mower 100 in preferred directions to traverse the problem areas 416. The mower 100 may traverse the travel path 402 based on the planned rotations. In one embodiment, the planned rotations may be determined before the mower 100 begins to traverse the travel path 402 to a destination waypoint within the current zone or a starting coordinate in a new zone. In another embodiment, the planned rotations may be determined during traversal of the travel path 402 but before the mower 100 reaches the problem area 416 or the prior rotatable area 416.

For each problem area 416, the mower 100 may identify the preferred direction to propel the mower through the problem area. For example, if the problem area 416 is associated with a positive grade (and the mower 100 being a rear-wheel drive machine), the mower may determine that the preferred direction is a forward direction through the problem area. Likewise, if the problem area 416 is associated with a negative grade, the mower may determine that the preferred direction is a reverse direction through the problem area.

Then, the mower 100 may determine the direction that the mower will traverse the rotatable area 414 that is located before, or prior to, the mower reaching the problem area 416. If the direction that the mower 100 will traverse the prior rotatable area 414 is different than the preferred direction through the problem area, then the mower will rotate (e.g., 180 degrees) in the prior rotatable area 414. If the direction that the mower 100 will traverse the prior rotatable area 414 is the same as the preferred direction through the problem area, then the mower will not rotate in the prior rotatable area 414.

In some embodiments, the controller 120 (FIG. 1) may be used to use and store various plots, curves, and data associated with or determined from the terrain map, including coordinates, elevations, grades, thresholds, rotatable areas, problem areas, travel paths, zones, work regions, and planned rotations.

One example of using planned rotations for the grade curve 412 is schematically illustrated in FIG. 5 using portions A, B, and C (shown aligned to the grade curve 412 of plot 410), which correspond to parts of the path 402. To begin, the mower 100 decides to travel down the portion A along the path 402 in a forward direction because the mower had determined that the first problem area 416 (left-most problem area) has a positive grade. The mower 100 does not rotate in the first rotatable area 414 (left-most rotatable area) and travels through the first problem area 416 (left-most problem area). Then, the mower 100 reaches the second rotatable area 414 (middle rotatable area) at point B and rotates 180 degrees. The mower 100 then continues down the portion C along the path 402 in a reverse direction because the mower had determined that the second problem area 416 (right-most problem area) has a negative grade.

Once rotations are planned for all problem areas 416 along the travel path 402, the mower 100 may be propelled along the travel path based on the planned rotations. The predetermined terrain map may not include, however, obstacles that have been placed along the travel path 402 that may impede the progress of the mower 100.

Planning rotations may be particularly useful for downhill grades at a boundary of a zone or work region. In general, rear-wheel drive mowers are susceptible to becoming stuck after stopping at a downhill boundary and attempting to move away from the boundary. By planning rotations, the mower 100 is configured to use an orientation (e.g., backward or forward) that provides the most traction to move uphill away from the boundary. Using planned rotations may be more beneficial to work regions in which the mower 100 encouters more turns, or boundaries (e.g., using travelling containment zones to cover a work region).

Figure 6:
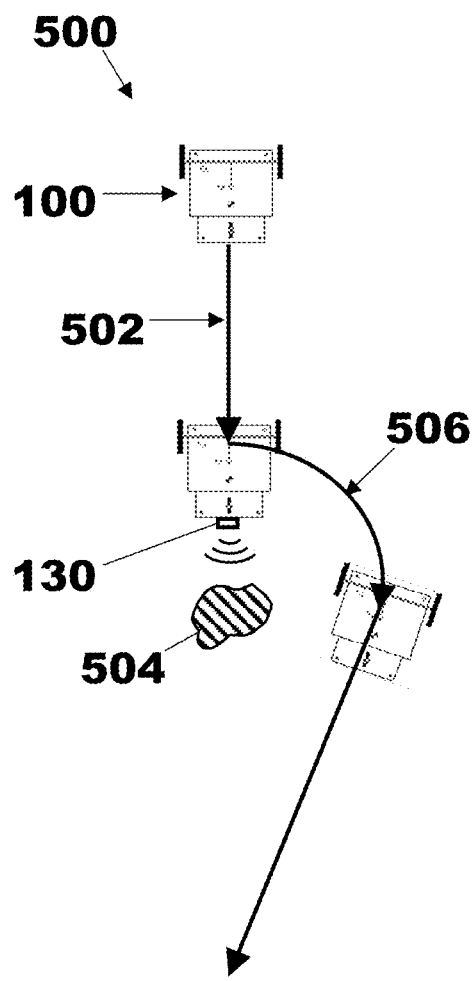
FIG. 6 is an overhead view of the machine of FIG. 1 performing an obstacle avoidance method in accordance with one embodiment of the present disclosure.

In FIG. 6, one method 500 for modifying a travel path 502 to deal an obstacle 504 is shown. As the mower 100 propels along the path 502, the mower uses the sensor 130 to detect the obstacle 504. The sensor 130 uses non-contact sensing to detect the obstacle 504 before the mower 100 contacts the obstacle. Upon detection of the obstacle 504, the mower 100 rotates to avoid the obstacle 504 and travel along a detour 506 around the obstacle (e.g., wide of the obstacle). Then, the mower 100 continues onward toward the planned destination waypoint after avoiding the obstacle. In some embodiments, the detour 506 may be analyzed for problem areas, similar to a planned travel path.

Figure 7:
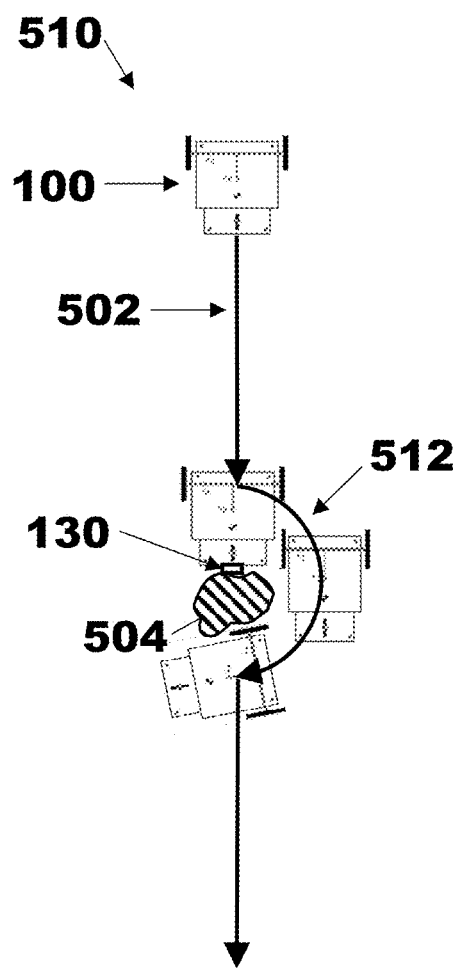
FIG. 7 is an overhead view of the machine of FIG. 1 performing another obstacle avoidance method in accordance with one embodiment of the present disclosure.

In FIG. 7, another method 510 for modifying the travel path 502 to deal with the obstacle 504 is shown. The method 510 is similar to method 500 in many respects, except that the sensor 130 uses contact sensing to detect the obstacle 504 upon contact of the mower 100 with the obstacle 504. The mower 100 rotates to avoid the obstacle 504 and travels along detour 512 around the obstacle (e.g., wide of the obstacle). In general, the detour 512 may take a path that is tighter to the obstacle 504 than detour 506. The mower 100 then continues onward toward the planned destination waypoint after clearing the obstacle. In some embodiments, the detour 512 may be analyzed for problem areas, similar to a planned travel path.

In some embodiments, the mower 100 may choose to use either method 500, 510. The sensor 130 may include both contact and non-contact sensing capabilities that are selectable by the mower 100. In one example, the mower 100 may select method 510 when travelling within a zone (e.g., to a destination waypoint within a current zone) to improve coverage of the zone. In another example, the mower 100 may select method 500 when travelling between zones (e.g., to a destination waypoint within a next zone), for example, because mowing while travelling between zones is not typically used to cover the work region.

Although the mower 100 is shown rotating counter-clockwise to avoid the obstacle 504 in FIGS. 6 and 7, the mower may also rotate in a clockwise direction to avoid the obstacle. The decision to rotate clockwise or counter-clockwise may be based on open area available in the work region. For example, the mower 100 may rotate toward the direction with more open area available. Additionally, or alternatively, the decision to rotate clockwise or counter-clockwise may be based on which orientation provides sufficient, or the most, traction.

The mower 100 may encounter various types of obstacles 504 (e.g., artificial or natural). Some obstacles may not be detectable by the sensor 130, for example, during a teaching or training mode. The mower 100 may detect some obstacles (e.g., a playground slide raised off the ground) by becoming stuck or by receiving user input (e.g., user-defined exclusion zones relatable to the terrain map) indicating the location of the obstacle. If the mower 100 gets stuck at a certain location in the terrain map, the mower may be configured to remember the location in the terrain map and conditions (e.g., pitch, roll, and/or heading). In some embodiments, the mower 100 may automatically identify and create an exclusion zone with or without permission of the user. When the terrain map is used for path planning, any path that includes the stuck location may be treated as an exclusion zone, an obstacle, or a grade that is too steep to traverse. The terrain map or other data structure may be updated to reflect the presence of such exclusion zones, obstacles, or grades. In other words, the mower 100 may avoid the same location and/or conditions leading to becoming stuck on subsequent planned paths. In this manner, methods 500, 510 may be used to avoid the obstacle 504 even when the sensor 130 does not directly detect the obstacle.

Figure 8:
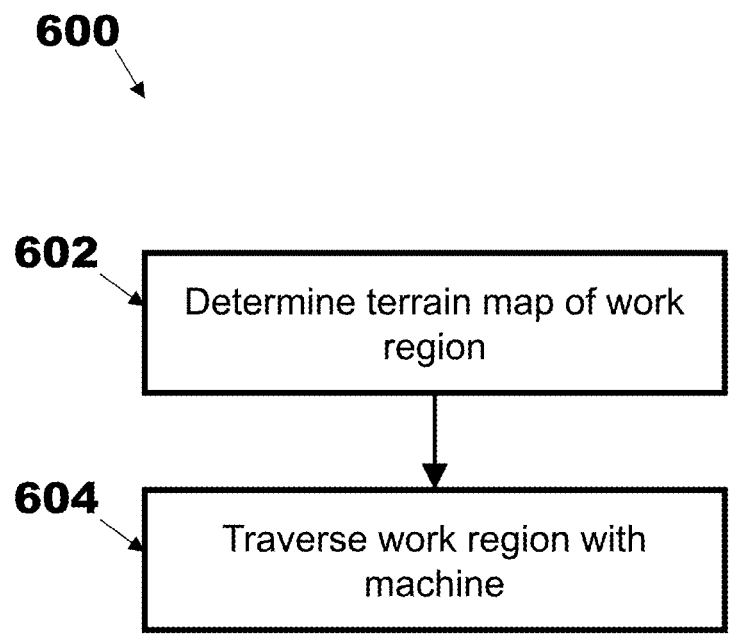
FIG. 8 is a flow diagram of one example of a method of operating the machine of FIG. 1 in accordance with one embodiment of the present disclosure.

Having described various functionality of the mower 100, various methods for operating the mower may be generated therefrom. In FIG. 8, a general method 600 of autonomously operating a grounds maintenance machine (e.g., the mower 100) is shown. The method 600 may include determining a terrain map of a work region 602. In some embodiments, the terrain map may be determined from a prior traversal of the work region stored in memory. In other embodiments, the terrain map may be determined from other data (e.g., training operations, GPS-collected data, etc.).

The method 600 may also include traversing the work region with the machine 604, in particular, based on data contained within the terrain map. In some embodiments, at least one of elevation and grade data may be used to plan a path of travel of the machine.

Figure 9:
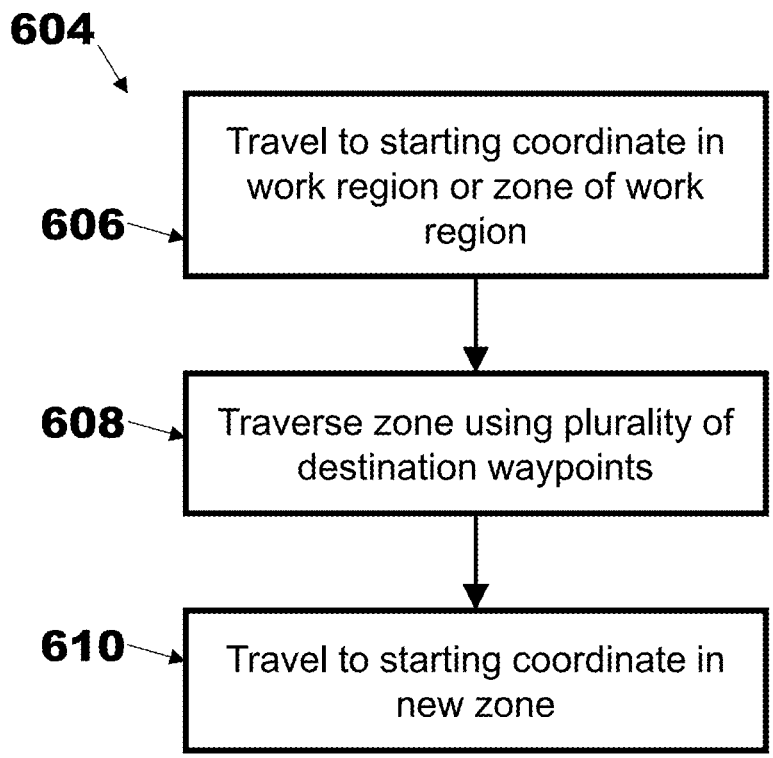
FIG. 9 is a flow diagram of one example of implementing traversing a work region of FIG. 8 with the machine of FIG. 1 in accordance with one embodiment of the present disclosure.

FIG. 9 shows one example of the method 604 of traversing the work region with the machine. The method 604 may include travelling to a starting coordinate in a work region 606. When the machine begins covering a work region or a zone therein, a starting coordinate may be determined for the machine to reach. The machine may not prioritize coverage when travelling to the starting coordinate (e.g., not cutting grass). The starting coordinate may be selected based on elevation or grade data. For example, the starting coordinate may be selected based on a highest elevation in the zone or based on a smallest local grade in the new zone.

The method 604 may also include traversing the zone using a plurality of destination waypoints 608. The destination waypoints may be determined one at a time. For example, the machine may determine a first destination waypoint to reach and then determine a second destination waypoint after reaching the first destination waypoint. This may be continued until the work region has been sufficiently covered (e.g., mowed). In some embodiments, the destination waypoints may be selected randomly along the border of the zone.

The method 604 may further include travelling to a starting coordinate in a new zone 610. The new zone may be determined once the current zone has been covered (e.g., finished with mowing).

Figure 10:
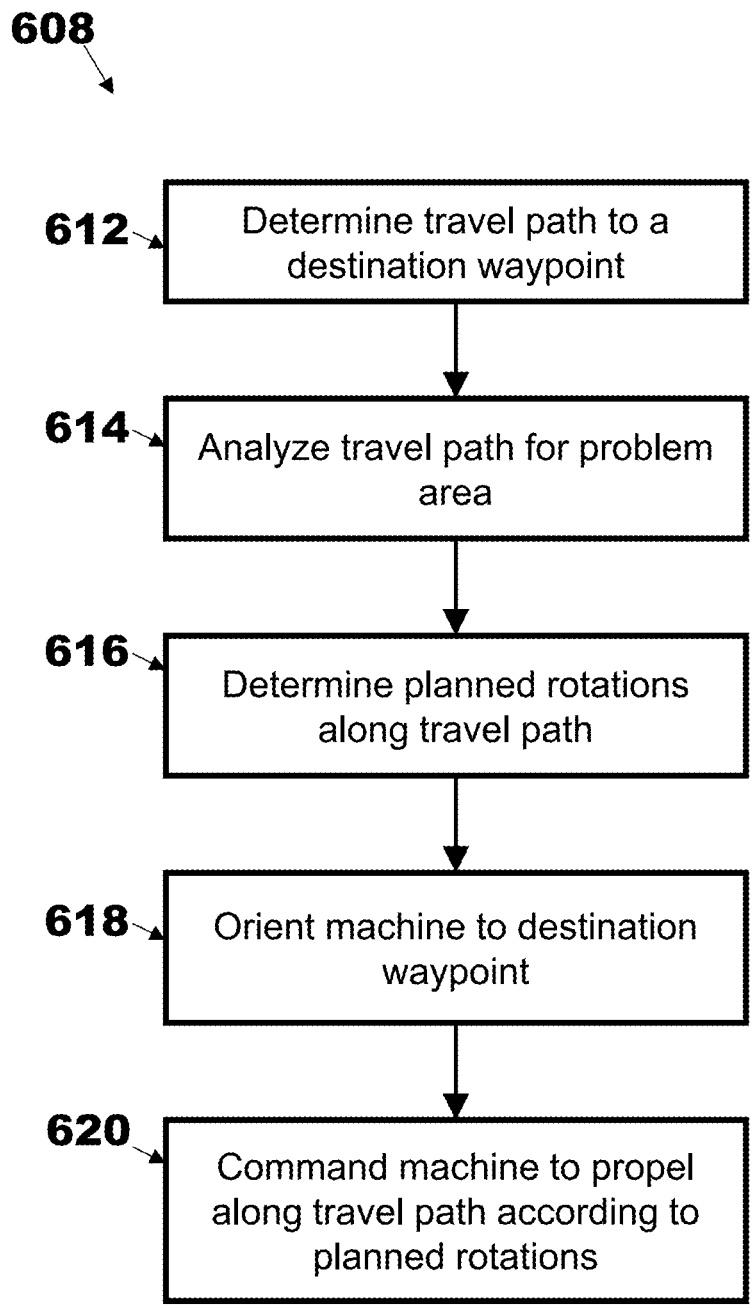
FIG. 10 is a flow diagram of one example of implementing traversing a zone using a plurality of waypoints of FIG. 9 with the machine of FIG. 1 in accordance with one embodiment of the present disclosure.

FIG. 10 shows one example of the method 608 of traversing the zone using a plurality of destination waypoints. In particular, the method 608 may generate a plan of travel for the machine. The method 608 may include determining a travel path 612. The travel path may be determined based on a randomly selected destination waypoint.

The method 608 may also include analyzing the travel path for problem areas 614. The analysis may be based on a terrain map that contains data for the travel path. The terrain map may include gradient data that may be used to determine portions of the travel path that are sufficiently steep (e.g., a high positive or negative grade) to qualify as problem areas.

Further, the method 608 may include determining planned rotations along the travel path 616. In particular, the machine may need to rotate to a preferred direction to traverse problem areas.

In addition, the method 608 may include orienting the machine to the destination waypoint 618. Orienting the machine 618 may preferably occur after determining the planned rotations 616 because the machine may decide to start in a forward or reverse direction depending on the outcome of the planned rotations for the travel path. This sequence may prevent extra rotations of the machine in the work region.

The method 608 further may include commanding the machine to propel along the travel path according to the planned rotations 620. As described above, the machine may be propelled in the forward or reverse direction to start along the travel path and may rotate as needed based on the planned rotations to reach the destination waypoint.

Figure 11:
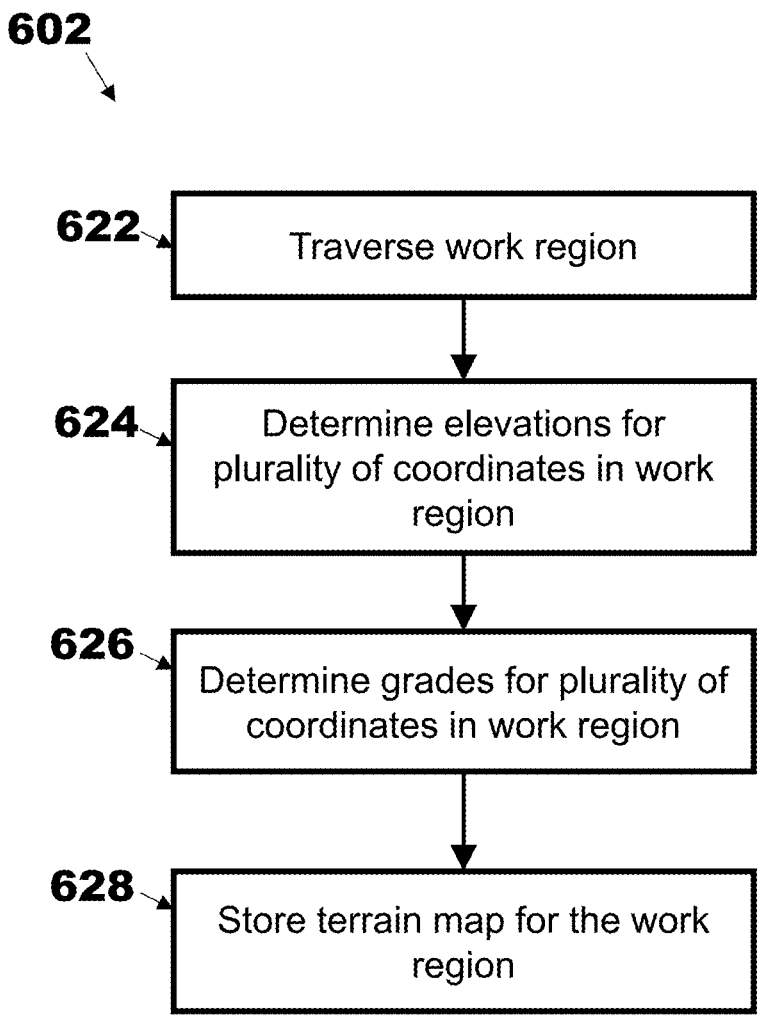
FIG. 11 is a flow diagram of one example of implementing determining a terrain map of a work region of FIG. 8 with the machine of FIG. 1 in accordance with one embodiment of the present disclosure.

FIG. 11 shows one example of the method 602 of determining the terrain map of the work region. The method 602 may include traversing the work region 622. Any suitable method of traversing the work region 622 may be selected. The pathing may not be randomly selected if the traversal is not intended to cover the work region (e.g., cut the grass).

The method 602 may include determining elevations for a plurality of coordinates in the work region 624. The elevation data may be used to facilitate planning a path of travel for the machine in subsequent traversals of the work region.

The method 602 further may include determining grades for the plurality of coordinates in the work region 626. The grade data may be used to facilitate planning a path of travel for the machine in subsequent traversals of the work region. The grades may be calculated based on the elevation data, for example, as slopes or using a differential function. Additionally, or alternatively, the method 602 may include measuring pitch, roll, or both of the mower to determine grades for the plurality of coordinates in the work region. In such embodiments, determining elevations 624 may be optional.

In addition, the method 602 may include storing a terrain map for the work region 628 based on the elevation and/or grade data. The stored terrain map may contain data that may be retrieved and used, for example, each time a travel path is determined to identify problem areas and/or rotatable areas.

Figure 12:
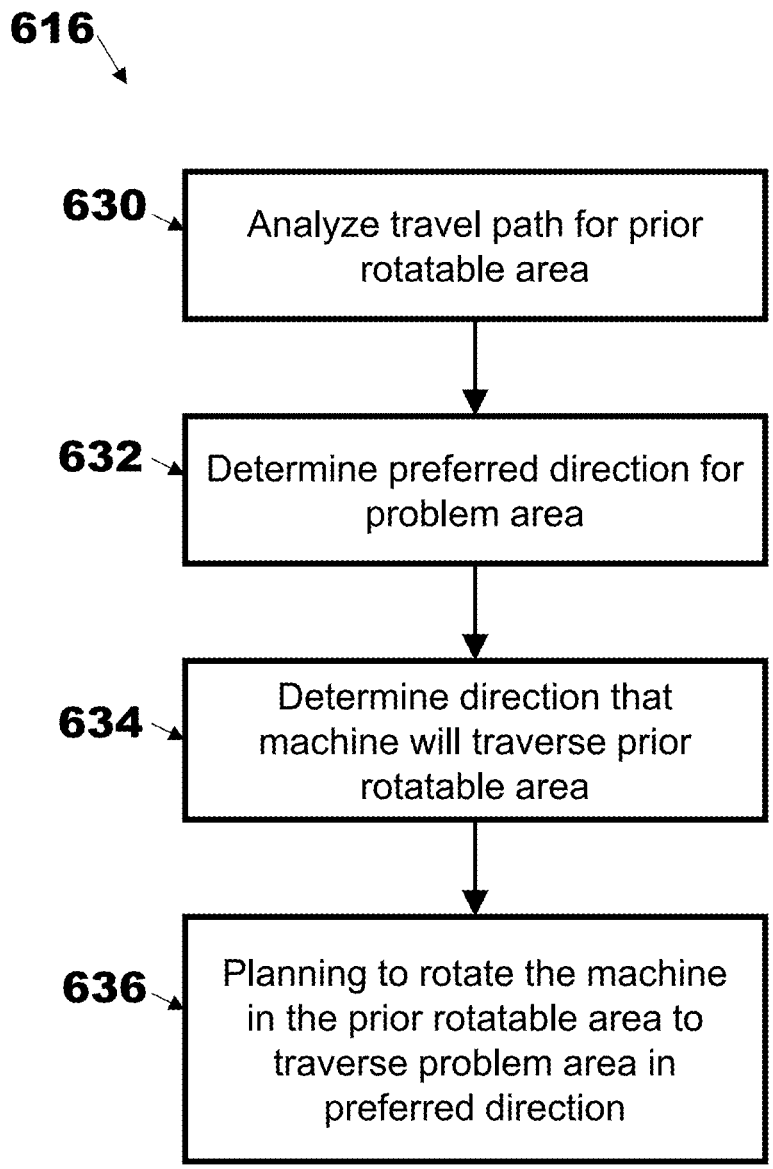
FIG. 12 is a flow diagram of one example of implementing determining planned rotations along the travel path of FIG. 10 with the machine of FIG. 1 in accordance with one embodiment of the present disclosure.

FIG. 12 shows one example of the method 616 for determining planned rotations along the travel path. The method 616 may include analyzing the travel path for prior rotatable areas 630. In particular, rotatable areas may be identified that the machine will traverse before reaching problem areas.

The method 616 may also include determining a preferred direction for the machine to traverse the problem area 632. For example, if the problem area has a positive grade, the machine will prefer a forward direction, and if the problem area has a negative grade, the machine will prefer a reverse direction (assuming the machine is rear-wheel drive and vice versa for front-wheel drive).

Further, the method 616 may include determining the direction that the machine will traverse a prior rotatable area 634.

In addition, method 616 may include planning to rotate the machine in the prior rotatable area (if needed) to traverse the problem area in the preferred direction. For example, if the preferred direction is forward and the machine will traverse the prior rotatable area in the reverse direction (e.g., opposite direction), the machine will rotate 180 degrees at the prior rotatable area. If the preferred direction and the direction through the rotatable area are the same, then the machine will not rotate at the prior rotatable area.

Figure 13:
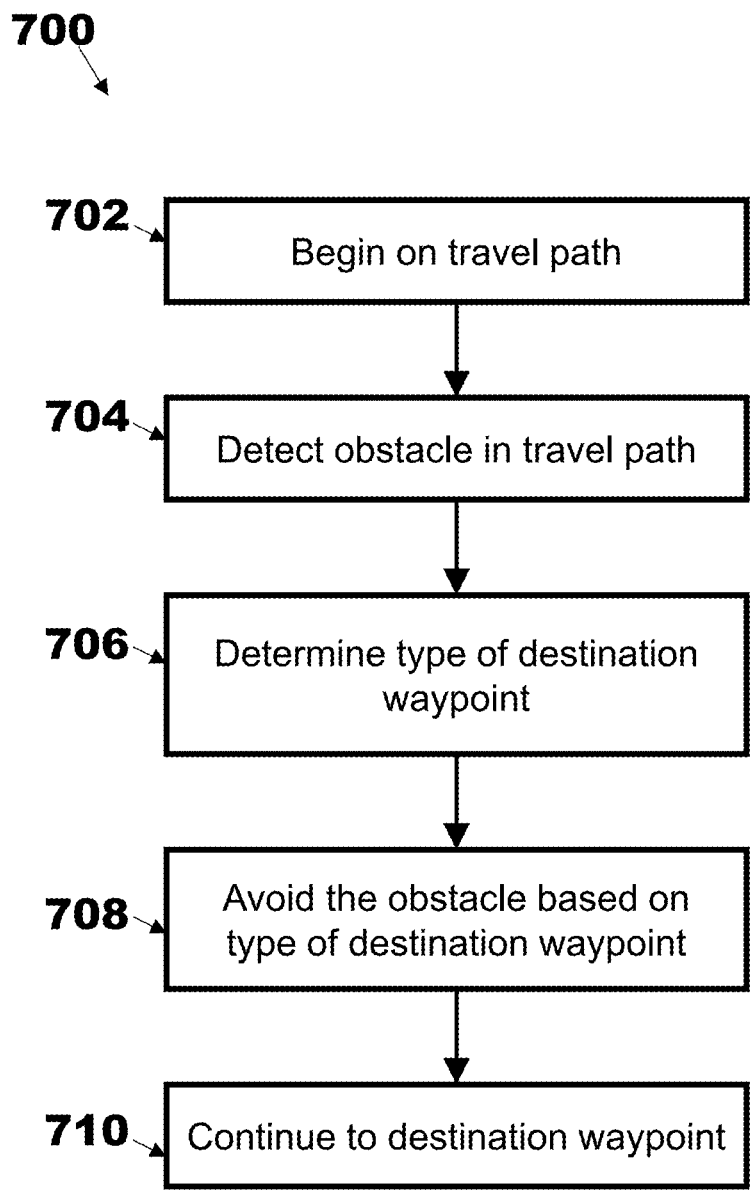
FIG. 13 is a method of avoiding obstacles along a travel path with the machine of FIG. 1 in accordance with one embodiment of the present disclosure.

Once the rotations have been planned and the machine is commanded to propel along the travel path 620 (FIG. 10), the machine may execute an obstacle detection method 700 for traveling along the path as illustrated in FIG. 13. The method 700 may include beginning along the travel path 702. A propulsion system may be used to drive the wheels in a forward or reverse direction.

The method 700 may also include detecting an obstacle in the travel path 704. The obstacle may be detected using contact or non-contact sensors.

The method 700 further may include determining the type of destination waypoint 706. For example, the destination waypoint may be a starting coordinate ("go to goal") or a coordinate within the current zone.

In addition, the method 700 may include avoiding the obstacle based on the type of destination waypoint 708. For example, if the destination waypoint is a starting coordinate, the mower may take a wider detour to avoid contact with the obstacle. If the destination waypoint is within the current zone, the mower may take a shorter detour around the obstacle for tight coverage of the zone around the obstacle. A propulsion system may be used to drive the wheels in a manner to take evasive action (e.g., rotating the machine and travelling around the obstacle).

Although determining the type of destination waypoint 708 as illustrated follows other processes (e.g., beginning on the travel path 702), the type of destination waypoint may be determined 706 at any point before evasive action is taken.

Further, the method 700 may include continuing to the destination waypoint 710 after the obstacle is cleared.

Figure 14:
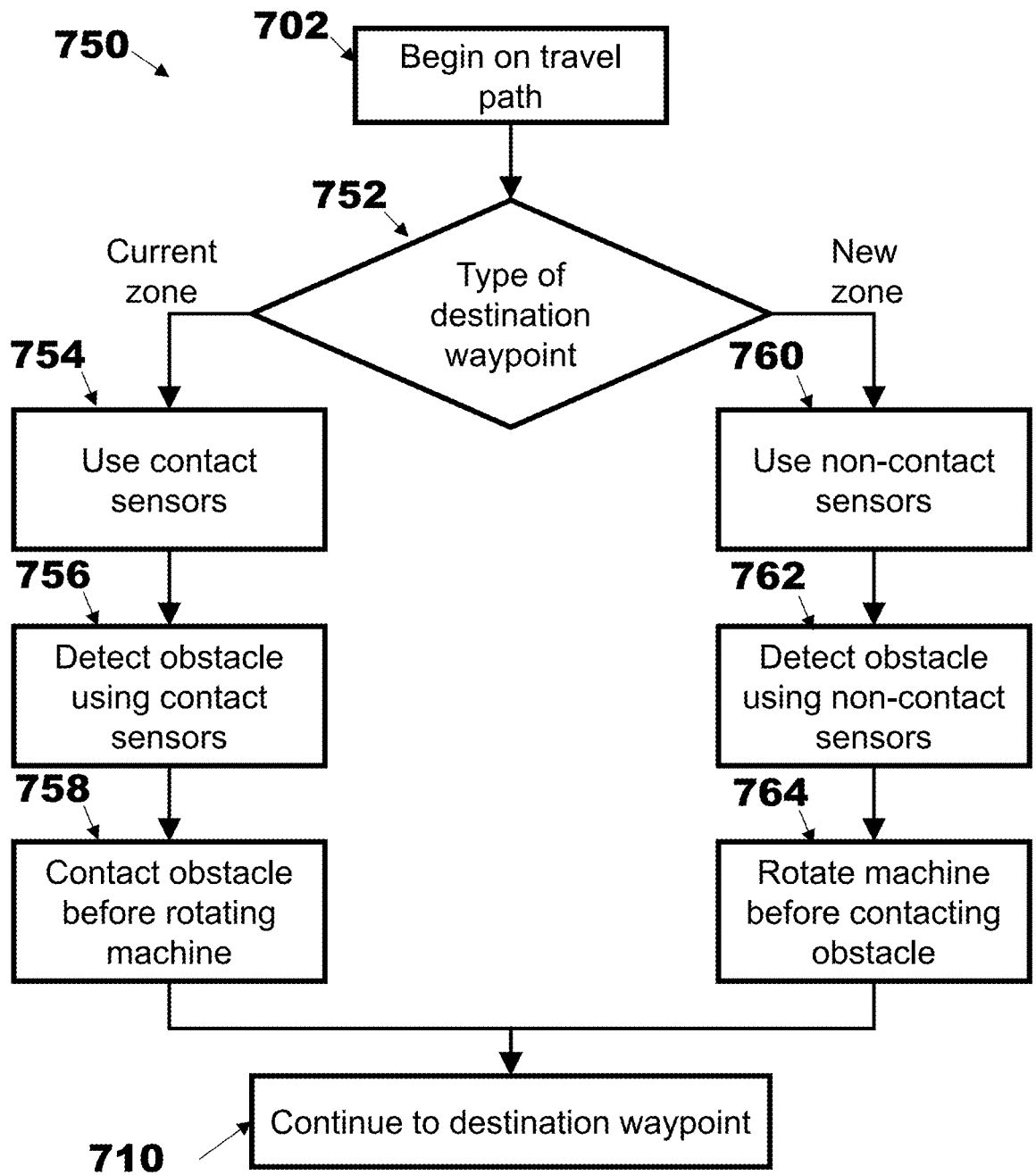
FIG. 14 is another method of avoiding obstacles along a travel path with the machine of FIG. 1 in accordance with one embodiment of the present disclosure.

A more detailed obstacle detection method 750 is shown in FIG. 14, which may also include beginning on a travel path 702. The method 750 may further include determining a type of destination waypoint 752. If the destination waypoint is within the current zone, the method 750 may use contact sensors 754 for obstacle detection. When the obstacle is detected using the contact sensors 756, the machine may contact the obstacle before rotating the machine 758 to take evasive action. If the destination waypoint is in a new zone, or outside the current zone, the method 750 may use non-contact sensors 760 for obstacle detection. When the obstacle is detected using the non-contact sensors 762, the machine may rotate before contacting the obstacle 764 to take evasive action. After taking evasive action, the method 750 may then include continuing to the destination waypoint 710.

Figure 15:
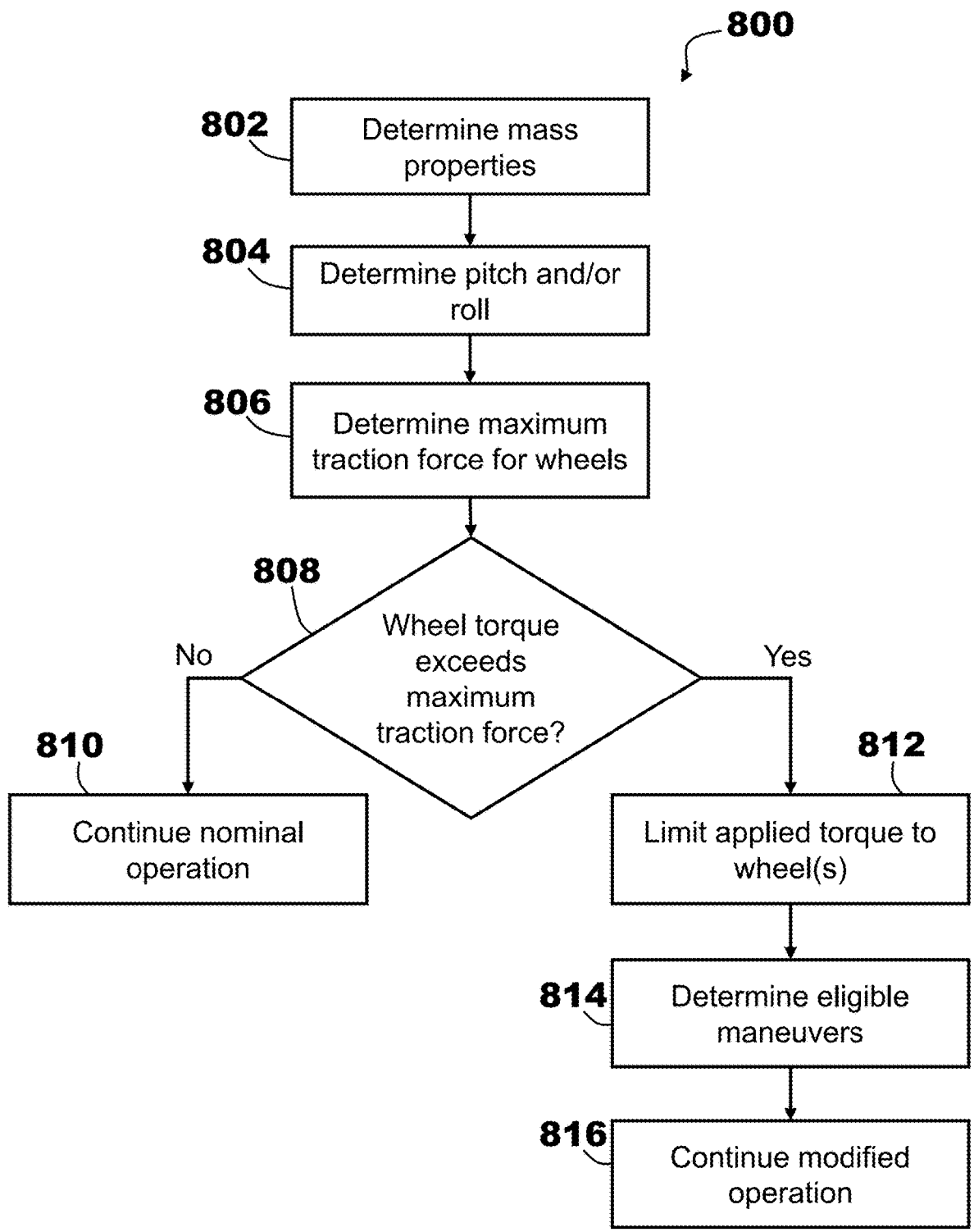
FIG. 15 is a method of traction control for the machine of FIG. 1 in accordance with one embodiment of the present disclosure.

FIG. 15 shows one example of a method 800 for traction control that may be used with an autonomous machine (e.g., mower 100 of FIG. 1). The method 800 may include determining mass properties (e.g., characterizing mass distribution) of the autonomous machine 802, which may be done during or before operation of the autonomous machine. In some embodiments, the autonomous machine may determine how weight is distributed at each wheel based on the mass properties. The method 800 may also include determining pitch, roll, or both pitch and roll of the autonomous machine 804, which may be measured using sensors of the navigation system (e.g., IMU). The mower 100 may be configured to determine or store mass property data (e.g., mass distribution data) and measured pitch and/or roll data.

Based on the mass properties and the pitch and/or roll, the method 800 may include determining a maximum traction force available at one or more of the driving wheels 806, for example, before executing a planned maneuver. Other information that may be used to determine the maximum traction force at each wheel includes, but is not limited to, wheel type (e.g., high or low traction wheels) and terrain conditions. Any suitable technique may be used to determine the maximum traction force available and terrain conditions, such as those available to one of ordinary skill in the art having the benefit of this disclosure. Various examples of techniques for determining terrain conditions include using a worse case scenario for traction and using measurements to estimate traction (e.g., online estimation).

If a wheel torque does not exceed the determined maximum traction force for the wheel 808, the method 800 may continue nominal operation of the autonomous machine 810. On the other hand, if a wheel torque exceeds the determined maximum traction force for the wheel 808, the method 800 may limit applied torque to the wheel of the autonomous machine 812.

In some embodiments, the method 800 may include determining maneuvers that are eligible 814 based on the current maximum traction force or at least based on the pitch or roll. Certain maneuvers may be deemed ineligible because the autonomous machine may become stuck if those maneuvers were to be performed at a particular pitch and/or roll of the autonomous machine. For example, when the autonomous machine is traveling up a slope, a maneuver traversing forward may be eligible while a maneuver traversing in reverse may be ineligible. The method 800 may continue modified operation of the autonomous machine using the limited applied torque and an eligible maneuver 816, which may reduce the risk of becoming stuck.

While the present disclosure is not so limited, an appreciation of various aspects of the disclosure will be gained through a discussion of the specific illustrative embodiments provided below, which provide advantages in path planning for trap and obstacle avoidance. Various modifications of the illustrative embodiments, as well as additional embodiments of the disclosure, will become apparent herein.

Illustrative Embodiments

In illustrative embodiment A1, a method of operation for an autonomous grounds maintenance machine comprises determining a travel path for the machine to reach a destination waypoint in a work region; analyzing whether the travel path will traverse a problem area based on a predetermined terrain map; determining planned rotations of the machine along the travel path based on the predetermined terrain map; and commanding the machine to propel along the travel path based on the planned rotations.

In illustrative embodiment A2, a method comprises the method according to any A embodiment, further comprising analyzing whether the travel path will cause the machine to traverse a prior rotatable area before the problem area using the predetermined terrain map; determining a preferred direction to propel the machine through the problem area; determining a direction that the machine will traverse the prior rotatable area; and planning to rotate the machine in the prior rotatable area in response to determining that the machine will traverse the prior rotatable area in a direction opposite to the preferred direction for the problem area.

In illustrative embodiment A3, a method comprises the method according to any A embodiment, further comprising determining a terrain map based on a previous traversal of the work region.

In illustrative embodiment A4, a method comprises the method according to embodiment A3, wherein determining the terrain map comprises determining a plurality of grades for a plurality of coordinates within the work region.

In illustrative embodiment A5, a method comprises the method according to embodiment A4, further comprising determining a plurality of elevations, pitch, or roll grades along the travel path in the terrain map.

In illustrative embodiment A6, a method comprises the method according to any A embodiment, wherein analyzing whether the travel path traverses a problem area comprises comparing a plurality of grades along the travel path to a threshold grade for problem areas.

In illustrative embodiment A7, a method comprises the method according to any A embodiment, further comprising analyzing whether the travel path traverses a rotatable area using a plurality of grades along the travel path and a threshold grade for rotatable areas.

In illustrative embodiment A8, a method comprises the method according to any A embodiment, further comprising analyzing a new travel path to a new destination waypoint for problem areas before rotating the machine to a new starting orientation.

In illustrative embodiment A9, a method comprises the method according to any A embodiment, wherein the destination waypoint is a next coordinate within a current zone or a starting coordinate within a new zone of the work region.

In illustrative embodiment A10, a method comprises the method according to embodiment A9, further comprising determining the starting coordinate within the new zone based on elevation or grade data using the predetermined terrain map.

In illustrative embodiment A11, a method comprises the method according to embodiment A10, wherein determining the starting coordinate within the new zone is based on a highest elevation in the new zone or a smallest local grade in the new zone.

In illustrative embodiment A12, a method comprises the method according to any A embodiment, further comprising detecting an obstacle along the travel path and taking evasive action.

In illustrative embodiment A13, a method comprises the method according to embodiment A12, further comprising determining whether the destination waypoint is a next coordinate within a current zone or a starting coordinate within a new zone of the work region.

In illustrative embodiment A14, a method comprises the method according to embodiment A13, further comprising avoiding the obstacle before or after contact with the obstacle is made.

In illustrative embodiment A15, a method comprises the method according to any A embodiment, wherein the zone is a travelling containment zone of the work region.

In illustrative embodiment B1, an autonomous grounds maintenance machine comprises a housing defining a front end and a rear end; an implement associated with the housing; at least one front wheel supporting the front end of the housing upon a ground surface; two rear wheels supporting the rear end of the housing upon the ground surface; an implement motor supported by the housing; a propulsion system supported by the housing and operably coupled to the rear wheels, wherein the propulsion system is adapted to control speed and rotational direction of the two rear wheels independently, thereby controlling both speed and direction of the housing over the ground surface; and a controller operably coupled to the propulsion system. The controller is adapted to generate a plan of travel for the housing. The controller is adapted to autonomously determine a travel path for the housing to reach a destination waypoint in a work region; analyze whether the travel path traverses a problem area based on a predetermined terrain map; plan rotations of the housing based on the predetermined terrain map; and command the propulsion system to propel the housing along the travel path based on the planned rotations.

In illustrative embodiment B2, a machine comprises the machine according to any B embodiment, wherein the controller is further adapted to autonomously: analyze whether the travel path will cause the housing to traverse a prior rotatable area before the problem area using the predetermined terrain map; determine a preferred direction to propel the housing through the problem area; determine a direction that the housing will traverse the prior rotatable area; and plan to rotate the housing in the prior rotatable area in response to determining that the housing will traverse the prior rotatable area in a direction opposite to the preferred direction for the problem area.

In illustrative embodiment B3, a machine comprises the machine according to any B embodiment, wherein the destination waypoint is contained within a travelling containment zone of the work region.

In illustrative embodiment B4, a machine comprises the machine according to embodiment B3, wherein the controller is further adapted to determine a terrain map for at least the travelling containment zone of the work region.

In illustrative embodiment B5, a machine comprises the machine according to any B embodiment, wherein determining the travel path comprises randomly selecting the destination waypoint or selecting the next destination waypoint in a planned pattern.

In illustrative embodiment B6, a machine comprises the machine according to any B embodiment, wherein the controller is further adapted to determine a plurality of grades along the travel path based on the predetermined terrain map.

In illustrative embodiment B7, a machine comprises the machine according to any B embodiment, wherein the controller is further adapted to: identify local maxima or minima along the travel path; and define a rotatable area at the local maxima or minima.

In illustrative embodiment B8, a machine comprises the machine according to any B embodiment, wherein the controller is further adapted to autonomously command the propulsion system to propel the housing along the travel path after planning the rotations of the housing.

In illustrative embodiment B9, a machine comprises the machine according to any B embodiment, wherein the controller is further adapted to autonomously analyze a new travel path to a new destination waypoint for problem areas before rotating the housing to a new starting orientation.

In illustrative embodiment B10, a machine comprises the machine according to any B embodiment, wherein the destination waypoint is a next coordinate within a current zone or a starting coordinate within a new zone of the work region.

In illustrative embodiment B11, a machine comprises the machine according to embodiment B10, wherein the controller is further adapted to autonomously determine the starting coordinate within the new zone based on elevation or grade data using the predetermined terrain map.

In illustrative embodiment B12, a machine comprises the machine according to embodiment B11, wherein determining the starting coordinate within the new zone is based on a highest elevation in the new zone or a smallest local grade in the new zone.

In illustrative embodiment C1, an autonomous grounds maintenance machine comprises: a housing defining a front end and a rear end; an implement associated with the housing; at least one front wheel supporting the front end of the housing upon a ground surface; two rear wheels supporting the rear end of the housing upon the ground surface; an implement motor supported by the housing; a propulsion system supported by the housing and operably coupled to the rear wheels, wherein the propulsion system is adapted to control speed and rotational direction of the two rear wheels independently, thereby controlling both speed and direction of the housing over the ground surface; an obstacle sensing circuit positioned to detect an obstacle in the direction of the front or rear end of the housing; and a controller operably coupled to the propulsion system and the obstacle sensing circuit. The controller is adapted to autonomously: determine planned rotations of the housing based on a predetermined terrain map and a current travel path; detect an obstacle along the current travel path to a destination waypoint in a work region using the obstacle sensing circuit; determine whether the destination waypoint is a next coordinate within a current zone or a starting coordinate within a new zone of the work region; in response to the destination waypoint being a next coordinate within the current zone, avoid the obstacle using a command to the propulsion system to propel the housing along the current travel path until contact with the obstacle is made and taking evasive action; and command the propulsion system to propel the housing toward the destination waypoint after avoiding the obstacle.

In illustrative embodiment C2, a machine comprises the machine according to any C embodiment, wherein the controller is further adapted to autonomously: in response to the destination waypoint being a starting coordinate, avoid the obstacle using a command to the propulsion system to propel the housing along the current travel path until contact with the obstacle is made or to rotate the housing before contact with the obstacle is made.

In illustrative embodiment C3, a machine comprises the machine according to embodiment C2, wherein avoiding the obstacle comprises determining whether to rotate the housing clockwise or counter-clockwise based on open area available in the work region.

In illustrative embodiment D1, a method or machine comprises the method or machine according to any A, B, or C embodiment, wherein applied wheel torque is limited in response to a measured pitch or roll of the machine.

In illustrative embodiment D2, a method or machine comprises the method or machine according to any D embodiment, wherein a maximum traction force is determined based on mass property data and the measured pitch or roll of the machine and the applied wheel torque is limited based on the maximum traction force.

In illustrative embodiment D3, a method or machine comprises the method or machine according to any D embodiment, wherein certain maneuvers of the machine are determined to be eligible based on the measured pitch or roll of the machine.

Thus, various embodiments of autonomous grounds maintenance machines with path planning for trap and obstacle avoidance are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

It will be understood that each block of the block diagrams and combinations of those blocks can be implemented by means for performing the illustrated function.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

What is claimed is:

1. A method of operation for an autonomous grounds maintenance machine comprising a controller adapted to perform the method, the method comprising:
    determining a travel path for the machine to reach a destination waypoint in a work region;
    analyzing whether the travel path will traverse a problem area based on a predetermined terrain map, the analysis indicating a risk of—immobility of the machine in the problem area due to at least one of: a grade in the problem area indicated by the terrain map; and a location in the problem area stored in the terrain map by the machine, the location being stored in response to getting previously stuck in the location, wherein no obstacle was detected by the machine at the location;
    determining planned rotations of the machine along the travel path based on the predetermined terrain map, the planned rotations reducing the risk of the -immobility in the problem area by causing at least one of: increasing traction of the machine in the problem area; and avoiding the location in the problem area; and
    commanding the machine to propel along the travel path based on the planned rotations.

2. The method of claim 1, further comprising:
    analyzing whether the travel path will cause the machine to traverse a prior rotatable area before the problem area using the predetermined terrain map;
    determining a preferred direction to propel the machine through the problem area;

determining a direction that the machine will traverse the prior rotatable area; and planning to rotate the machine in the prior rotatable area in response to determining that the machine will traverse the prior rotatable area in a direction different from the preferred direction for the problem area.

3. The method of claim 1, further comprising determining the predetermined terrain map based on a previous traversal of the work region.

4. The method of claim 1, wherein the risk of immobility comprises a loss of traction of the machine in the problem area, and the predetermined terrain map comprises a plurality of grades for a plurality of coordinates within the work region, the problem area being identified based on the grade in the problem area, the planned rotations orienting the machine to increase the traction of the machine in the problem area.

5. The method of claim 4, further comprising determining a plurality of elevations, pitch, or roll grades along the travel path in the predetermined terrain map.

6. The method of claim 1, wherein the risk of immobility comprises a loss of traction of the machine in the problem area, and analyzing whether the travel path traverses the problem area comprises comparing a plurality of grades along the travel path to a threshold grade for problem areas, the grade of the problem area exceeding the threshold grade.

7. The method of claim 1, wherein the risk of immobility comprises a loss of traction of the machine in the problem area, the method further comprising analyzing whether the travel path traverses a rotatable area using a plurality of grades along the travel path and a threshold grade for rotatable areas, the grade of the problem area exceeding the threshold grade.

8. The method of claim 1, further comprising analyzing a new travel path to a new destination waypoint for problem areas before rotating the machine to a new starting orientation.

9. The method of claim 8, further comprising determining a starting coordinate within a new zone based on elevation or grade data using the predetermined terrain map.

10. An autonomous grounds maintenance machine comprising:
a housing defining a front end and a rear end;
an implement associated with the housing;
at least one front wheel supporting the front end of the housing upon a ground surface;
two rear wheels supporting the rear end of the housing upon the ground surface;
an implement motor supported by the housing;
a propulsion system supported by the housing and operably coupled to the rear wheels, wherein the propulsion system is adapted to control speed and rotational direction of the two rear wheels independently, thereby controlling both speed and direction of the housing over the ground surface; and
a controller operably coupled to the propulsion system, wherein the controller is adapted to generate a plan of travel for the housing, wherein the controller is adapted to autonomously:
determine a travel path for the housing to reach a destination waypoint in a work region;
analyze whether the travel path traverses a problem area based on a predetermined terrain map, the analysis indicating a risk of loss of mobility in the problem area due to at least one of: a grade in the problem area indicated by the terrain map; and a location in the problem area stored in the terrain map by the machine, the location being stored in response to getting previously stuck in the location, wherein no obstacle was detected by the machine at the location;
plan rotations of the housing based on the predetermined terrain map, the rotations reducing the risk of the loss of mobility in the problem area by causing at least one of: increasing traction of the machine in the problem area; and avoiding the location in the problem area; and command the propulsion system to propel the housing along the travel path based on the planned rotations.

11. The machine of claim 10, wherein the controller is further adapted to autonomously:
analyze whether the travel path will cause the housing to traverse a prior rotatable area before the problem area using the predetermined terrain map;
determine a preferred direction to propel the housing through the problem area;
determine a direction that the housing will traverse the prior rotatable area; and
plan to rotate the housing in the prior rotatable area in response to determining that the housing will traverse the prior rotatable area in a direction different from the preferred direction for the problem area.

12. The machine of claim 10, wherein determining the travel path comprises randomly selecting the destination waypoint or selecting a next destination waypoint in a planned pattern.

13. The machine of claim 10, wherein the controller is further adapted to:
identify local maxima or minima along the travel path; and
define a rotatable area at the local maxima or minima.

14. The machine of claim 10, wherein the controller is further adapted to autonomously command the propulsion system to propel the housing along the travel path after planning the rotations of the housing.

15. An autonomous grounds maintenance machine comprising:
a housing defining a front end and a rear end;
an implement associated with the housing;
at least one front wheel supporting the front end of the housing upon a ground surface;
two rear wheels supporting the rear end of the housing upon the ground surface;
an implement motor supported by the housing;
a propulsion system supported by the housing and operably coupled to the rear wheels, wherein the propulsion system is adapted to control speed and rotational direction of the two rear wheels independently, thereby controlling both speed and direction of the housing over the ground surface;
an obstacle sensing circuit positioned to detect an obstacle in the direction of the front or rear end of the housing; and
a controller operably coupled to the propulsion system and the obstacle sensing circuit, wherein the controller is adapted to autonomously:
determine planned rotations of the housing based on a predetermined terrain map and a current travel path;
detect an obstacle along the current travel path to a destination waypoint in a work region using the obstacle sensing circuit;
determine whether the destination waypoint is a next coordinate within a current zone or a starting coordinate within a new zone of the work region;

in response to the destination waypoint being a next coordinate within the current zone, avoid the obstacle using a command to the propulsion system to propel the housing along the current travel path until contact with the obstacle is made and taking evasive action; and command the propulsion system to propel the housing toward the destination waypoint after avoiding the obstacle.

16. The machine of claim 15, wherein the controller is further adapted to autonomously:

in response to the destination waypoint being the starting coordinate within the new zone, avoid the obstacle using a command to the propulsion system to propel the housing along the current travel path until contact with the obstacle is made or to rotate the housing before contact with the obstacle is made.

17. The machine of claim 16, wherein avoiding the obstacle comprises determining whether to rotate the housing clockwise or counter-clockwise based on open area available in the work region.

18. The machine of claim 15, wherein applied wheel torque is limited in response to a measured pitch or roll of the machine.

19. The machine of claim 18, wherein a maximum traction force is determined based on mass property data and the measured pitch or roll of the machine and the applied wheel torque is limited based on the maximum traction force.

20. The machine of claim 18, wherein certain maneuvers of the machine are determined to be eligible based on the measured pitch or roll of the machine.

21. The machine of claim 10, wherein the risk of the loss of mobility comprises a loss of traction of the machine in the problem area, the planned rotations increasing the traction of the machine in the problem area.

22. The method of claim 1, wherein the risk of immobility comprises a loss of traction of the machine in the problem area, the planned rotations orienting the machine to increase the traction of the machine in the problem area.

23. The method of claim 1, wherein the risk of immobility is due to the machine getting previously stuck in the location by an obstacle not detected by an obstacle detecting sensor of the machine, and wherein the planned rotations avoid the obstacle without detecting the obstacle by the obstacle detecting sensor.

* * * * *

UNITED STATES PATENT AND TRADEMARK OFFICE
CERTIFICATE OF CORRECTION

PATENT NO. : 11,350,563 B2
APPLICATION NO. : 16/422153
DATED : June 7, 2022
INVENTOR(S) : Jason T. Kraft It is certified that error appears in the above-identified patent and that said Letters Patent is hereby corrected as shown below:

In the Claims

In Claim 1, Line 8, 'of--immobility' should read --of immobility--.

In Claim 1, Line 17, 'the -immobility' should read --the immobility--.

Signed and Sealed this
Seventh Day of March, 2023

Katherine Kelly Vidal
*Director of the United States Patent and Trademark Office*